(12) United States Patent
Wie

(10) Patent No.: US 6,917,862 B2
(45) Date of Patent: Jul. 12, 2005

(54) SINGULARITY ESCAPE/AVOIDANCE STEERING LOGIC FOR CONTROL MOMENT GYRO SYSTEMS

(75) Inventor: Bong Wie, Phoenix, AZ (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 10/652,219

(22) Filed: Aug. 28, 2003

(65) Prior Publication Data

US 2004/0111194 A1 Jun. 10, 2004

Related U.S. Application Data

(60) Provisional application No. 60/407,334, filed on Aug. 28, 2002, and provisional application No. 60/493,923, filed on Aug. 8, 2003.

(51) Int. Cl.[7] ............................................... B64C 1/28
(52) U.S. Cl. .............................. 701/13; 701/4; 244/154
(58) Field of Search .............................. 701/3, 4, 13, 9, 701/200, 164, 165; 244/1; 74/5.4, 5.42

(56) References Cited

U.S. PATENT DOCUMENTS

| | | | | |
|---|---|---|---|---|
| 5,435,503 | A | * 7/1995 | Johnson et al. | ............ 244/3.15 |
| 6,039,290 | A | 3/2000 | Wie et al. | |
| 6,047,927 | A | * 4/2000 | Heiberg et al. | ............. 244/165 |
| 6,128,556 | A | * 10/2000 | Bailey | ......................... 701/13 |
| 6,131,056 | A | * 10/2000 | Bailey et al. | ................. 701/13 |
| 6,648,274 | B1 | * 11/2003 | Bailey et al. | ............... 244/165 |
| 6,681,649 | B2 | * 1/2004 | Hyde et al. | .................... 74/5.47 |
| 6,682,019 | B2 | * 1/2004 | Bailey | ........................ 244/164 |

OTHER PUBLICATIONS

Margulies, G. et al, "Geometric Theory of Single–Gimbal Control Moment Gyro Systems," Journal of the Astronautical Sciences, Apr–Jun. 1978, pp. 159–191, vol. 26, No. 2.

Cornick, D.E., "Singularity Avoidance Control Laws for Single Gimbal Control . . . ," Proceedings of the AIAA Guidance and Control Reference, Boulder, CO., Aug. 1979, p. 20–33.

Bedrossian, N.S. et al, "Redundant Single Gimbal Control Moment Gyroscope Singularity . . . ," Journal of Guidance, Control and Dynamics, Nov–Dec 1990, p. 1096–1101, vol. 13, No 6.

Bedrossian, N.S. et al., "Steering Law Design for Redundant Single–Gimbal Control . . . ," Journal of Guidance, Control, and Dynamics, Nov–Dec 1990, p. 1083–1089, vol. 13, No 6.

Vadali, S.R. et al, "Preferred Gimbal Angles for Single Gimbal Control Moment . . . ", Journal of Guidance, Control, and Dynamics, Nov–Dec 1990, p. 1090–1095, vol. 13, No 6.

(Continued)

Primary Examiner—Richard M. Camby
(74) Attorney, Agent, or Firm—Gallagher & Kennedy, P.A.; Thomas D. MacBlain

(57) ABSTRACT

A new steering logic based on a mixed weighted two-norm and least squares optimization solution overcomes a deficiency of being trapped in the momentum saturation singularities. The new steering logic utilizes an additional weighting matrix, W, in conjunction with deterministic dither signals in a weighting matrix V. The new steering logic also provides a simple means of avoiding troublesome, internal elliptic singularities which are commonly encountered by most other pseudoinverse-based steering logic. Various CMG systems, such as a typical pyramid array of four single-gimbal CMGs, two and three parallel single-gimbal CMG configurations, and four parallel double-gimbal CMGs of the International Space Station are described as illustrative embodiments demonstrating the simplicity and effectiveness of the new steering logic.

28 Claims, 14 Drawing Sheets

OTHER PUBLICATIONS

Paradiso, J.A. et al, "Global Steering of Single Gimballed Control Moment Gyroscopes . . . ," Journal of Guidance, Control, and Dynamics, Sep–Oct 1992, p. 1236–1244, vol. 15, No 5.

Schaub, H et al, "Singularity Avoidance Using Null Motion and Variable–Speed Control . . . ," Journal of Guidance, Control, and Dynamics, Jan –Feb 2000, p. 11–16, vol. 23, No 1.

Ford, K.A. et al, "Singular Direction Avoidance Steering for Control . . . ," Journal of Guidance, Control, and Dynamics, Jan–Feb 2000, p. 648–656, vol. 23, No 1.

Heiberg, C.J. et al, "Precision Spacecraft Pointing Using Single–Gimbal Control Moment . . . ," Journal of Guidance, Control, and Dynamics, Jan–Feb 2000, p 77–85, vol. 23, No. 1.

Wie, B, "Rotational Maneuvers and Attitude Control," Space Vehicle Dynamics and Control, 1998,p 381–459, Amer Inst of Aeronautics and Astronautics, Reston, VA.

Wie, B et al, "Singularity Robust Steering Logic for Redundant Single–Gimbal Control . . . ," Journal of Guidance, Control, and Dynamics, Sep–Oct 2001, p 865–872, vol. 24, No 5.

Wie, B et al, "Rapid Multi–Target Acquisition and Pointing Control of Agile . . . ," Journal of Guidance, Control, and Dynamics, Jan–Feb 2002, p 96–104, vol. 25, No 1.

Dominguez, J et al, "Computation and Visualization of Control Moment Gyroscope . . . ," AIAA Guidance, Navigation, and Control Conf., Monterey, CA, Paper No 2002–4570, p 595–604.

Roser, X et al, "Control Moment Gyroscopes (CMGs) . . . ," Proceedings Third Int'l Conf on Spacecraft Guidance . . . , Noordwijk, The Netherlands,Nov 26–29, 1996, p 523–528.

Busseuil, J et al, "High Precision Mini–CMG's and their Spacecraft Applications," AAS Guidance and Control, 1998, p 90–107, vol. 98.

Salenc, C et al, "AOCS for Agile Scientific Spacecraft with mini–CMGs," Proceedings Fourth Int'l Conf on Spacecraft . . . , Noordwijk, The Netherlands, Oct. 18–21, 1999, p 379–384.

Defendini, A et al, "Low Cost CMG–based AOCS Designs," Fourth Int'l Conf on Spacecraft Guidance . . . , Noordwijk, The Netherlands, Oct 18–21, 1999, p 392–398.

Lappas, V.J. et al, "Attitude Control for Small Satellites Using Control Moment Gyros," AAS Space Debris 2001 Science and Technology Series, vol. 105.

Nakamura, Y et al, "Inverse Kinematic Solutions with Singularity Robustness . . . ," Journal of Dynamic Systems, Measurement, and Control, Sep 1986, p 163–171, vol. 108, No 3.

* cited by examiner

4H Saturation Singularity

2H Internal Singularity

0H Internal Singularity

No Singularity

SINGULARITY ESCAPE/AVOIDANCE STEERING LOGIC FOR CONTROL MOMENT GYRO SYSTEMS

CROSS REFERENCE TO RELATED APPLICATION

This application claims priority from provisional patent applications Ser. Nos. 60/407,334 filed Aug. 28, 2002 and 60/493,923 filed Aug. 8, 2003 in the name of Bong Wie entitled "Singularity Escape/Avoidance Steering Logic for Control Moment Gyro System," both of which are incorporated herein by reference.

FIELD OF THE INVENTION

This invention relates to control moment gyro (CMG) steering logic and more particularly to such logic that improves the escape from and/or avoids singularities.

BACKGROUND

Control moment gyros (CMGs), as applied to spacecraft attitude control and momentum management, have been extensively studied during the past three decades, Refs. 1–8, and more recently in Refs. 9–17. They have been successfully employed for a variety of space missions, such as the Skylab, the MIR station, and the International Space Station (ISS). However, CMGs have never been used in commercial communications and imaging satellites because their higher torque capabilities have not been needed by most commercial and imaging satellites and also because CMGs are much more expensive and mechanically complex than reaction wheels.

A CMG contains a spinning rotor with large, constant angular momentum, but whose angular momentum vector direction can be changed with respect to the spacecraft by gimballing the spinning rotor. Such a CMG is the Astrium/Teldix DMG 15–45S. The spinning rotor is mounted on a gimbal (or a set of gimbals), and torquing the gimbal results in a precessional, gyroscopic reaction torque orthogonal to both the rotor spin and gimbal axes. The CMB is a torque amplification device because small gimbal torque input produces large control torque output on the spacecraft. Because the CMGs are capable of generating large control torques and storing large angular momentum over long periods of time, they have been employed for attitude control and momentum management of large space vehicles, such as the International Space Station (ISS). Four parallel mounted double-gimbal CMGs with a total weight of about 2400 LB and with a design life of 10 years are employed on the ISS. In particular, Kennel's steering law (Ref. 4) has been implemented on the double-gimbaled CMG system of the ISS.

Most of the next-generation commercial imaging satellites may be equipped with CMGs because such satellites will require rapid rotational maneuverability for high-resolution images (Refs. 18–22). In the interest of higher resolution images, a narrower field of vision will be required. To be able to image points of interest more widely distributed than points within the narrow angle of vision of the satellite, rapid slewing movement will be needed. Rather than sweeping the imaging system from side-to-side, the whole spacecraft body will turn rapidly. Pointing the entire spacecraft allows the body-fixed imaging system with a narrow field of view to achieve a higher definition and improves the resolution for its images. The overall cost and effectiveness of such agile spacecraft is greatly affected by the average retargeting time. Thus, the development of a low-cost attitude control system employing smaller and inexpensive CMGs, called mini-CMGs, is of current practical importance for developing future agile imaging spacecraft (Refs. 19–21) as well as small agile satellites (Ref. 22).

The use of CMGs necessitates the development of CMG steering logic which generates the CMG gimbal rate commands in response to the CMG torque commands. One of the principal difficulties in using CMGs for spacecraft attitude control and momentum management is the geometric singularity problem in which no control torque is generated for the commanded control torques along a particular direction. At such a singularity, CMG torque is available in all but one direction. The problem of overcoming singularities in CMG systems has previously been addressed. Approaches to the problem have been largely, but not entirely, successful.

The CMG singularity problem, studied previously by Margulies and Aubrun (Ref. 2) and Bedrossian et al. (Refs. 5 and 6), has been further examined recently in Ref. 23, incorporated herein by reference, to characterize and visualize the physical as well as mathematical nature of the singularities, singular momentum surfaces, and other singularity related problems. The steering logic that may be considered "baseline" steering logic for CMGs is pseudo-inverse steering logic, discussed below. It is not free of singularities.

A simple yet effective way of passing through, and also escaping from, any internal singularities, as applied to agile spacecraft pointing control, has been developed in Refs. 13–16, incorporated herein by reference. The CMG steering logic developed and patented by Wie, Bailey and Heiberg of Refs. 13 and 14 is mainly intended for typical reorientation maneuvers in which precision pointing or tracking is not required during reorientation maneuvers, and it fully utilizes the available CMG momentum space in the presence of any singularities. Although there are special missions in which prescribed attitude trajectories are to be "exactly" tracked in the presence of internal singularities, most practical cases will require a tradeoff between robust singularity transit/escape and the resulting, transient pointing errors.

Because the singularity-robust steering logic developed in Refs. 13 and 14 is based on the minimum two-norm, pseudoinverse solution, it does not explicitly avoid singularity encounters. Rather it approaches and rapidly transits unavoidable singularities whenever needed. It effectively generates deterministic dither signals when the system becomes near singular. Any internal singularities can be escaped for any nonzero constant torque commands using the singularity-robust steering logic.

However, the patented CMG steering logic of Refs. 13 and 14 is unable to escape the saturation singularities of certain CMG configurations, which can be problematic if CMG momentum desaturation is desired. Consequently, a new steering logic is desirable to overcome such a deficiency of the singularity-robust CMG steering logic. Furthermore, the new steering logic should provide an effective means of explicitly avoiding, instead of passing through, the internal elliptic singularities that are commonly encountered by most other pseudoinverse-based steering logic.

Control Moment Gyro Systems

There follows a summary of several representative CMG systems. Detailed descriptions of these systems can be found in Ref. 23. These CMG systems will be used in connection with a description of specific exemplary embodiments to demonstrate the simplicity and effectiveness of the new steering logic.

Pyramid Array of Four Single-Gimbal CMGs

For a typical pyramid mount of four single-gimbal CMGs with skew angle of $\beta$, shown in FIG. 1, the total CMG momentum vector is represented by $$H = h_1(x_1) + h_2(x_2) + h_3(x_3) + h_4(x_4) \quad [1]$$

$$= \begin{bmatrix} -c\beta\sin x_1 \\ \cos x_1 \\ s\beta\sin x_1 \end{bmatrix} + \begin{bmatrix} -\cos x_2 \\ -c\beta\sin x_2 \\ s\beta\sin x_2 \end{bmatrix} + \begin{bmatrix} c\beta\sin x_3 \\ -\cos x_3 \\ s\beta\sin x_3 \end{bmatrix} + \begin{bmatrix} \cos x_4 \\ c\beta\sin x_4 \\ s\beta\sin x_4 \end{bmatrix}$$

where $x_i$ is the ith gimbal angle, $c\beta \equiv \cos\beta$, and $s\beta \equiv \sin\beta$. Then we obtain $$\dot{H} = A\dot{x} \quad [2]$$

where $\dot{x} = (\dot{x}_1, \dot{x}_2, \dot{x}_3, \dot{x}_4)$ and A is the Jacobian matrix defined as $$A = \begin{bmatrix} -c\beta\cos x_1 & \sin x_2 & c\beta\cos x_3 & -\sin x_4 \\ -\sin x_1 & -c\beta\cos x_2 & \sin x_3 & c\beta\cos x_4 \\ s\beta\cos x_1 & s\beta\cos x_2 & s\beta\cos x_3 & s\beta\cos x_4 \end{bmatrix} \quad [3]$$

Equation (2) represents a linear mapping from $\dot{x} = (\dot{x}_1, \dot{x}_2, \dot{x}_3, \dot{x}_4)$ to $\dot{H} = (\dot{H}x, \dot{H}y, \dot{H}z)$.

Two different types of the internal singularity for the pyramid array of four CMGs are illustrated in FIGS. 1(a) and (b). The well known, troublesome elliptic singularity at (−90, 0, 90, 0) deg, which cannot be escaped by null motion, is illustrated in FIG. 1(a). The hyperbolic singularity at (−90, 0, 90, 180) deg, which can be escaped by null motion, is shown in FIG. 1(b). Detailed analyses and discussions of CMG singularities can be found in Refs. 5 and 23.

When $\beta = 90$ deg. FIG. 1 is a 4-CMG configuration with two orthogonal pairs of scissored CMGs. The Jacobian [3] becomes:

$$A = \begin{bmatrix} 0 & \sin x_2 & 0 & -\sin x_4 \\ -\sin x_1 & 0 & \sin x_3 & 0 \\ \cos x_1 & \cos x_2 & \cos x_3 & \cos x_4 \end{bmatrix}$$

This special configuration is also of practical importance, as studied extensively in Refs. 1 and 23. Many other CMG configurations are some variants of this basic arrangement of two orthogonal pairs of two parallel CMGs.

Two and Three Parallel Single-Gimbal CMG Configurations

Two and three single-gimbal CMGs with parallel gimbal axes have been investigated in Refs. 1, 2 and 23 for two-axis control of a spacecraft. For a system of two CMGs without redundancy, the momentum vectors, $\vec{H}_1$ and $\vec{H}_2$ move in the (x, y) plane normal to the gimbal axis as shown in FIG. 2. For such "scissored" single-gimbal CMGs, the total CMG momentum vector is simply represented as $$H = \begin{bmatrix} \cos x_1 + \cos x_2 \\ \sin x_1 + \sin x_2 \end{bmatrix} \quad [4]$$

where a constant unit momentum for each CMG is assumed.

Defining a new set of gimbal angles, $\alpha$ and $\beta$, as follows:

$$\alpha = \frac{x_1 + x_2}{2}, \beta = \frac{x_2 - x_1}{2} \quad [5]$$

where $\alpha$ is called the "rotation" angle and $\beta$ the "scissor" angle (Ref 1), one obtains $$H = 2\begin{bmatrix} \cos\alpha\cos\beta \\ \sin\alpha\cos\beta \end{bmatrix} \quad [6]$$

and $$\dot{H} = A\dot{x} \quad [7]$$

where $\dot{H} = (\dot{H}x, \dot{H}y), \dot{x} = (\dot\alpha, \dot\beta)$, and A is the Jacobian matrix defined as $$A = 2\begin{bmatrix} -\sin\alpha\cos\beta, & -\cos\alpha\sin\beta \\ \cos\alpha\cos\beta, & -\sin\alpha\sin\beta \end{bmatrix} \quad [8]$$

For a system of three single-gimbal CMGs with parallel gimbal axes, the total CMG angular momentum vector is:

$$H = \begin{bmatrix} \cos x_1 + \cos x_2 + \cos x_3 \\ \sin x_1 + \sin x_2 + \sin x_3 \end{bmatrix}$$

and the Jacobian matrix for $x = (x_1, x_2, x_3)$ becomes $$A = \begin{bmatrix} -\sin x_1 & -\sin x_2 & -\sin x_3 \\ \cos x_1 & \cos x_2 & \cos x_3 \end{bmatrix}$$

The singular momentum surfaces of this systems of three parallel single-gimbal CMGs are described by two circles as shown in FIG. 4. The internal hyperbolic singularity is shown in FIG. 4(a) and the external (saturation) elliptic singularity in FIG. 4(b). Detailed singularity analysis of this system can be found in Refs. 2 and 23.

Four Parallel Double-Gimbal CMGs

For a double-gimbal control moment gyro (DGCMG), the rotor is suspended inside two gimbals and consequently the rotor momentum can be oriented on a sphere along any direction provided no restrictive gimbal stops. For the different purposes of redundancy management and failure accommodation, several different arrangements of DGCMGs have been developed, such as three orthogonally mounted DGCMGs used in the Skylab and four parallel mounted DGCMGs employed for the International Space Station.

As shown by Kennel (Ref. 4), mounting of DGCMGs of unlimited outer gimbal angle freedom with all their outer gimbal axes parallel allows drastic simplification of the CMG steering law development in the redundancy management and failure accommodation and in the mounting hardware.

Such a parallel mounting arrangement of four double-gimbal CMGs with the inner and outer gimbal angles, $\alpha_i$ and $\beta_i$ of the ith CMG, is shown diagrammatically in FIG. 3. The total CMG momentum vector $H = (H_x, H_y, H_z)$ is expressed in the (x, y, z) axes as $$H = \begin{bmatrix} \sum \sin\alpha_i \\ \sum \cos\alpha_i \cos\beta_i \\ \sum \cos\alpha_i \sin\beta_i \end{bmatrix} \quad [9]$$

where a constant unit momentum is assumed for each CMG. The time derivative of H becomes $$\dot{H} = \begin{bmatrix} \sum \cos\alpha_i \dot{\alpha}_i \\ \sum (-\sin\alpha_i \cos\beta_i \dot{\alpha}_i - \cos\alpha_i \sin\beta_i \dot{\beta}_i) \\ \sum (-\sin\alpha_i \sin\beta_i \dot{\alpha}_i - \cos\alpha_i \cos\beta_i \dot{\beta}_i) \end{bmatrix} \quad [10]$$

Note that the x-axis torque component is not a function of the outer gimbal $\beta_i$, motions. Consequently, in Kennel's CMG steering law implemented on the International Space Station, the inner gimbal rate commands, $\dot{\alpha}_i$, are determined first for the commanded x-axis torque, then the outer gimbal rate commands, $\dot{\beta}_i$, for the commanded y- and z-axis torques.

Typical singularities of a system of four parallel double-gimbal CMGs are illustrated in FIGS. 4(a)-(d). The 4H saturation singularity is an elliptic singularity which cannot be escaped by null motion. The 2H and 0H singularities, shown in FIGS. 4(b) and (c) respectively, are hyperbolic singularities which can be escaped by null motion. A non-singular configuration but with a zero momentum is also shown in FIG. 4(d).

The various CMG systems described in this section are used below to demonstrate the simplicity and effectiveness of the new singularity escape/avoidance logic according to this invention.

Pseudoinverse Steering Logic

Ignoring the effect of spacecraft angular motion, the instantaneous torque vector, $\vec{\tau}$, generated by CMG gimbal motion $\dot{x}_i$ can be defined as $$\vec{\tau} = \frac{d\vec{H}}{dt} = \sum_{i=1}^{n} \frac{d\vec{h}_i}{dx_i} \dot{x}_i \quad [11]$$

or, in matrix form, as $$\tau = \frac{dH}{dt} = \sum_{i=1}^{n} \frac{dh_i}{dx_i} \dot{x}_i = A\dot{x} \quad [12]$$

where A is a 3×n Jacobian matrix and $\dot{x}=(\dot{x}_1, \ldots \dot{x}_n)$.

For the given control torque command $\tau$, the gimbal rate command $\dot{x}$, often referred to as the pseudoinverse steering logic, is then obtained as $$\dot{x} = A^+\tau \quad [13]$$

where $$A^+ = A^T(AA^T)^{-1} \quad [14]$$

This pseudoinverse is the minimum two-norm solution of the following constrained minimization problem:

$$\min_{\dot{x}} \|\dot{x}\|^2 \text{ subject to } A\dot{x} = \tau \quad [15]$$

where $\|\dot{x}\|^2 = \dot{x}^T\dot{x}$. Most CMG steering laws determine the gimbal rate commands with some variant of the pseudoinverse of the form of the above expression [14].

The pseudoinverse is a special case of the weighted minimum two-norm solution $$\dot{x} = A^+\tau \text{ where } A^+ = Q^{-1}A^T[AQ^{-1}A^T]^{-1} \quad [16]$$

of the following constrained minimization problem:

$$\min_{\dot{x}} \|\dot{x}\|^2_Q \text{ subject to } A\dot{x} = \tau \quad [17]$$

where $\|\dot{x}\|^2_Q = \dot{x}^T Q\dot{x}$ and $Q=Q^T>0$. Below, the significance of choosing $Q \neq I$, where I is an identify matrix, is demonstrated.

If rank (A)<m for certain sets of gimbal angles, or equivalently rank $(AA^T)$<m, when A is an m×n matrix, the pseudoinverse does not exist, and it is said that the pseudoinverse steering logic encounters singular states. This singular situation occurs when all individual CMG torque output vectors are perpendicular to the commanded torque direction. Equivalently, the singular situation occurs when all individual CMG momentum vectors have extremal projections onto the commanded torque $\tau$.

Since the pseudoinverse, $A^+ = A^T(AA^T)^{-1}$, is the minimum two-norm solution of gimbal rates subject to the constraint $A\dot{x}=\tau$, the pseudoinverse steering logic and all other pseudoinverse-based steering logic tend to leave inefficiently positioned CMGs alone causing the gimbal angles to eventually "hang-up" in anti-parallel singular arrangements. That is, they tend to steer the gimbals toward anti-parallel singular states. Despite this deficiency, the psuedoinverse steering logic, or some variant of pseudoinverse, is commonly employed for most CMG systems because of its simplicity for onboard, real-time implementation.

Nakamura, Y. and Hanafusa, H., in Ref. 24, describe a singularity robust steering logic in which:

$$A^\# = A^T[AA^T + \lambda I]^{-1}. \quad [18]$$

The singularity robust inverse steering logic, $\dot{x} = A^\# u$, does not become singular; i.e., $\det[AA^T + \lambda I] \neq 0$. This solves the large majority of singularity problems in CMG steering logic. However, $\dot{x}$ becomes zero if $\det(AA^T)=0$ and if a control torque is commanded along the singular direction. The CMG system with the singularity robust inverse steering logic can then become trapped in the singular state.

Singularity Escape/Avoidance Steering Logic

A simple yet effective way of passing through and escaping any internal singularities was developed by Wie, Bailey and Heiberg (Refs. 13–16). Such a singularity-robust CMG steering logic was mainly intended for typical reorientation maneuvers in which precision pointing or tracking is not required during reorientation maneuvers, and it fully utilizes the available CMG momentum space in the presence of any singularities.

The singularity-robust steering logic of Refs. 13–14 has the following form:

$$\dot{x} = A^\# \tau \quad [19]$$

where $$A^{\#} = [A^T PA + \lambda I]^{-1} A^T P = A^T [AA^T + \lambda E]^{-1} \quad [20]$$

and $$P^{-1} \equiv E = \begin{bmatrix} 1 & \varepsilon_3 & \varepsilon_2 \\ \varepsilon_3 & 1 & \varepsilon \\ \varepsilon_2 & \varepsilon_1 & 1^1 \end{bmatrix} > 0. \quad [21]$$

The positive scalar $\lambda$ and the off-diagonal elements $\varepsilon_i$ are to be properly selected such that $A^{\#}\tau \neq 0$ for any nonzero constant $\tau$.

Note that there exists always a null vector of $A^{\#}$ since rank $(A^{\#}) < 3$ for any $\lambda$ and $\varepsilon_i$ when the Jacobian matrix A is singular. Consequently, a simple way of guaranteeing that $A^{\#}\tau \neq 0$ for any nonzero constant $\tau$ command is to continuously modulate $\varepsilon_i$, for example, as follows:

$$\varepsilon_i = \varepsilon_0 \sin(\omega t + \phi_i) \quad [22]$$

where the amplitude $\varepsilon_0$, the modulation frequency $\omega$, and the phases $\phi_i$ need to be appropriately selected. The scalar $\lambda$ may be adjusted as:

$$\lambda = \lambda_0 \exp(-\mu \det(AA^T)) \quad [23]$$

where $\lambda_0$ and $\mu$ are constants to be properly selected.

It is emphasized that the singularity-robust inverse of the form (20) is based on the mixed, two-norm and weighted least-squares minimization although the resulting effect is somewhat similar to that of artificially misaligning the commanded control torque vector from the singular vector directions. Because the singularity robust steering logic is based on the minimum two-norm, pseudoinverse solution, it does not explicitly avoid singularity encounters but it rather approaches and rapidly transits unavoidable singularities whenever needed. The steering logic effectively generates deterministic dither signals when the system becomes near singular. Any internal singularities can be escaped for any nonzero constant torque commands using the singularity robust steering logic.

However, a certain type of external saturation singularity cannot be escaped for any choice of $\lambda$ and $\varepsilon_i$, as shown below and therefore a need exists for further improvement in CMG steering logic to escape and/or avoid all singularities, internal and external.

SUMMARY OF THE INVENTION

With this invention, there is provided CMG steering logic with improved singularity robustness. Particularly, improved CMG steering logic that eliminates or avoids singularities such as occur in even the most robust prior CMG control is provided.

The CMG steering logic of this invention is based on the well-known mixed weighted two-norm and least-squares optimization solution with weighting matrices W and V. The proper use of W, in conjunction with the deterministic dither signals in V, eliminates a deficiency of the patented steering logic of Refs. 13 and 14. Either W (i.e. the weighted pseudoinverse solution) or V alone do not completely eliminate the deficiency; i.e. both W and V are required for completely resolving the singularity escape/avoidance problem.

Some internal elliptic singularities can be explicitly avoided or skirted by a proper selection of the weighting matrix W. However, the steering logic of the invention rather tends to approach and rapidly transit unavoidable singularities whenever necessary.

A trial-and-error, intuitive approach is used for choosing proper W's in several embodiments of the invention. The steering logic of the invention is simple to implement compared to many other explicit singularity-avoidance algorithms employing, for example, gradient methods, global search, optimization and/or null motion.

The transient torque errors inherent to the steering logic of the invention during singularity escapes or transits will be acceptable in most practical situations in which precision pointing or tracking is not required during CMG momentum desaturation, CMG reconfiguration or spacecraft reorientation maneuvers.

It will be seen that a new steering logic utilizing a mixed weighted two-norm and least squares optimization solution has been developed to overcome a deficiency of the previously patented steering logic. It can also be employed to explicitly avoid singularity encounters for which most other pseudoinverse-based steering logic either fail or must transit through. The practicality, effectiveness and simplicity of the new singularity escape/avoidance logic, even in the presence of gimbal-rate limit, are demonstrated for various CMG systems.

The above and further objects and advantages of the invention will be better understood from the following detailed description of preferred embodiments taken in consideration with the accompanying drawings.

DETAILED DESCRIPTION

Figure 1:
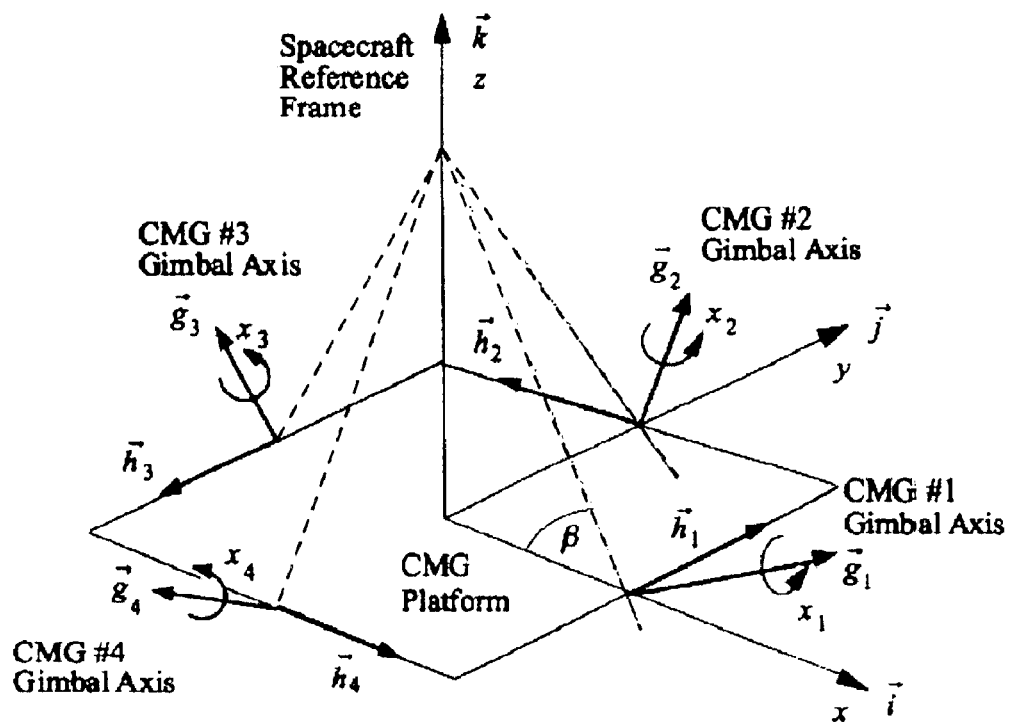
FIG. 1 is a diagrammatic illustration of a CMG platform having a "pyramid" mounting arrangement of four single-gimbal CMGs.
Figure 1A:
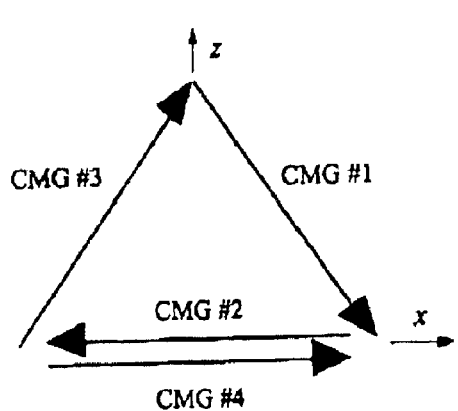
FIGS. 1(a) and (b) are vector diagrams of a 2H internal elliptical singularity (a) and 9H internal hyperbolic singularity (b) with the CMG arrangement of FIG. 1.
Figure 1B:
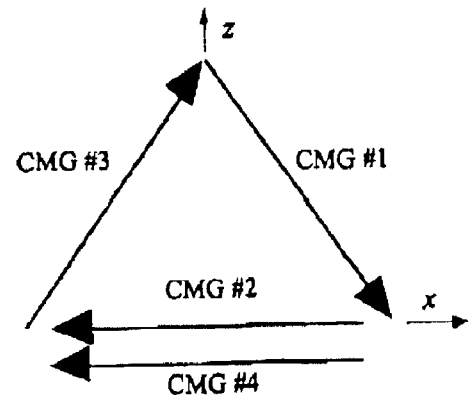

In accordance with this invention, a new steering logic which is capable of escaping all types of singularities, is of substantially the form $$\dot{x} = A^\# \tau \quad [24]$$

where $$A^\# = [A^T PA + Q]^{-1} A^T P \quad [25]$$
$$\equiv Q^{-1} A^T [A Q^{-1} A^T + P^{-1}]^{-1}$$
$$\equiv W A^T [A W A^T + V]^{-1}$$

where W≡$Q^{-1}$ and V≡$P^{-1}$. For a 3×n Jacobian matrix A, $\lfloor A^T PA+Q \rfloor$ is an n×n matrix and $\lfloor AWA^T+V \rfloor$ is a 3×3 matrix.

The singularity-robust inverse of the form [25] is the solution of the well-known, mixed two-norm and least-squares minimization problem:

$$\min_{\dot{x}} (e^T Pe + \dot{x}^T Q \dot{x}) \quad [26]$$

where e=A$\dot{x}$−τ is the torque error vector. Because P and Q are positive definite matrices, $\lfloor A^T PA=Q \rfloor$ and $\lfloor AWA^T+V \rfloor$ are always nonsingular.

The weighting matrices, P and Q (equivalently, W and V), must be properly chosen: (i) to obtain acceptable levels of torque errors and gimbal rates, (ii) to escape any internal as well as external singularities, and (iii) to pass through singularities or avoid singularity encounters.

For example, P is chosen such that $A^T P\tau \neq 0$ for any torque command τ, as follows:

$$P^{-1} \equiv V = \lambda \begin{bmatrix} 1 & \varepsilon_3 & \varepsilon_2 \\ \varepsilon_3 & 1 & \varepsilon_1 \\ \varepsilon_2 & \varepsilon_1 & 1 \end{bmatrix} > 0 \quad [27]$$

and $$\lambda = \lambda_0 \exp(-\mu \det(AA^T)) \quad [28]$$

$$\varepsilon_i = \varepsilon_0 \sin(\omega t + \phi_i) \quad [29]$$

where the constant parameters, $\lambda_0$, $\mu$, $\varepsilon_0$, $\omega$, and $\phi_i$, need to be appropriately selected.

Because the condition $A^T P\tau \neq 0$, which is a necessary condition, is not sufficient for escaping and/or avoiding singularities, the matrix Q also needs to be properly chosen, as follows:

$$Q^{-1} \equiv W = \begin{bmatrix} W_1 & \lambda & \lambda & \lambda \\ \lambda & W_2 & \lambda & \lambda \\ \lambda & \lambda & W_3 & \lambda \\ \lambda & \lambda & \lambda & W_4 \end{bmatrix} > 0. \quad [30]$$

Different values of $W_i$ and/or nonzero off-diagonal elements are needed to be able to escape all types of singularities, including the external saturation singularities when CMG momentum desaturation is requested. Furthermore, a proper choice of W≠I provides an effective means for "explicitly" avoiding singularity encounters (to be demonstrated in the next section).

Several examples of demonstrating the significance of W≠I for escaping a certain type of external saturation singularities for which the previous singularity-robust steering logic of Wie, Bailey and Heiberg (Refs. 13 and 14) fails are presented in the discussion entitled "Exemplary Embodiments," below. Examples of avoiding an internal elliptic singularity for which the previous singularity-robust steering logic had to pass through are also presented.

Exemplary Embodiments

In the following exemplary embodiments, the simplicity and effectiveness of the new steering logic will be demonstrated using various CMG systems, such as two and three parallel single-gimbal CMG configurations, a pyramid array of four single-gimbal CMGs and four parallel double-gimbal CMGs of the International Space Station.

Two Parallel Single-Gimbal CMGs

Figure 2:
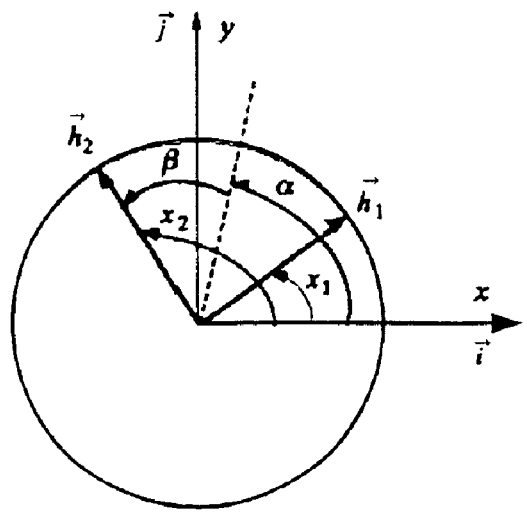
FIG. 2 is a diagrammatic illustration of the characteristics of two single gimbal CMGs with parallel gimbal axes.
Figures 2A, 2B:
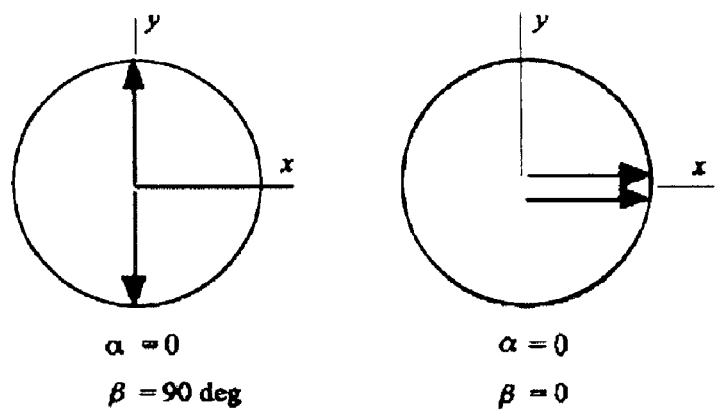
FIG. 2(a) is a diagrammatic illustration of a 0H antiparallel singularity of the CMG arrangement of FIG. 2.
FIG. 2(b) is a diagrammatic illustration of a 2H parallel singularity of a CMG arrangement of FIG. 2.

For a system of two parallel single-gimbal CMGs illustrated in FIG. 2 we have the CMG momentum vector H as $$H = 2 \begin{bmatrix} \cos\alpha\cos\beta \\ \sin\alpha\cos\beta \end{bmatrix} \quad [31]$$

and the Jacobian matrix A as $$A = 2 \begin{bmatrix} -\sin\alpha\cos\beta & -\cos\alpha\sin\beta \\ \cos\alpha\cos\beta & -\sin\alpha\sin\beta \end{bmatrix} \quad [32]$$

where α is called the "rotation" angle and β the "scissor" angle.

Figure 3:
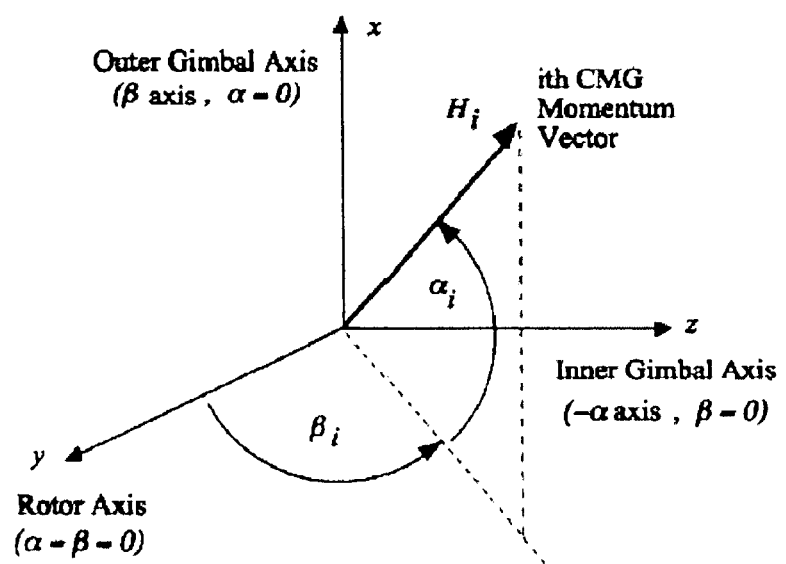
FIG. 3 is a diagrammatic illustration of the characteristics of four parallel-mounted double-gimbal CMGs.

For the internal anti-parallel singularity at x=(α,β)=(0,π/2), shown in FIG. 3(a), the Jacobian matrix becomes $$A = \begin{bmatrix} 0 & -2 \\ 0 & 0 \end{bmatrix}$$

with its singular vector u=(0,1); i.e., $A^T$u-0. A null space vector of A such that A$\dot{x}$=0 is: $\dot{x}$=null(A)=(1,0).

Although null motion does exist from this singularity, this hyperbolic singularity cannot be escaped by null motion because the singular configuration (($\beta$=$\pi$/2) remains undisturbed during this null motion along the null manifold (or a degenerate trajectory). Although null motion can be generated at this hyperbolic singularity, this example demonstrates that the mere existence of null motion does not guarantee escape from a singularity (Refs. 5 and 23). However, this type of internal singularity can be easily escaped by the singularity-robust steering logic of Refs. 13 and 14.

For the saturation singularity at x=($\alpha$,$\beta$)=(0,0), shown in FIG. 3(b), the Jacobian matrix becomes $$A = \begin{bmatrix} 0 & 0 \\ 2 & 0 \end{bmatrix}$$

with its singular vector u=(−1,0) and its null space vector $\dot{x}$=null(A)=(0,1). This external elliptic singularity cannot be escaped by null motion because null motion does not exist in the vicinity of this momentum saturation singularity, as discussed in Refs. 5 and 23.

The singularity-robust inverse of Refs. 13 and 14 with $\lambda$=0.1 and $\epsilon$=0.1 becomes $$A^{\#} = A^T [AA^T + 0.1E]^{-1} = \begin{bmatrix} -0.0488 & 0.4879 \\ 0 & 0 \end{bmatrix}$$

$$\Rightarrow \dot{x} = A^{\#} \begin{bmatrix} -1 \\ 0 \end{bmatrix} = \begin{bmatrix} 0.0488 \\ 0 \end{bmatrix}$$

Note that $\dot{x}$=($\dot{\alpha}$,$\dot{\beta}$)≠0, but $\dot{\beta}$=0; i.e., the system remains singular while $\alpha$ changes. In fact, $\dot{\beta}$=0 for any torque command vector $\tau$ and any $\epsilon_i$. Consequently, the singularity-robust steering logic of Refs. 13 and 14 is unable to command a non-zero $\dot{\beta}$ for this special case. However, this external singularity can be escaped by the new singularity escape/avoidance steering logic, proposed in this paper, of the form: $\dot{x}$=$A^{\#}\tau$ where $$A^{\#}=WA^T[AWA^T+V]^{-1}. \quad [33]$$

Figure 5:
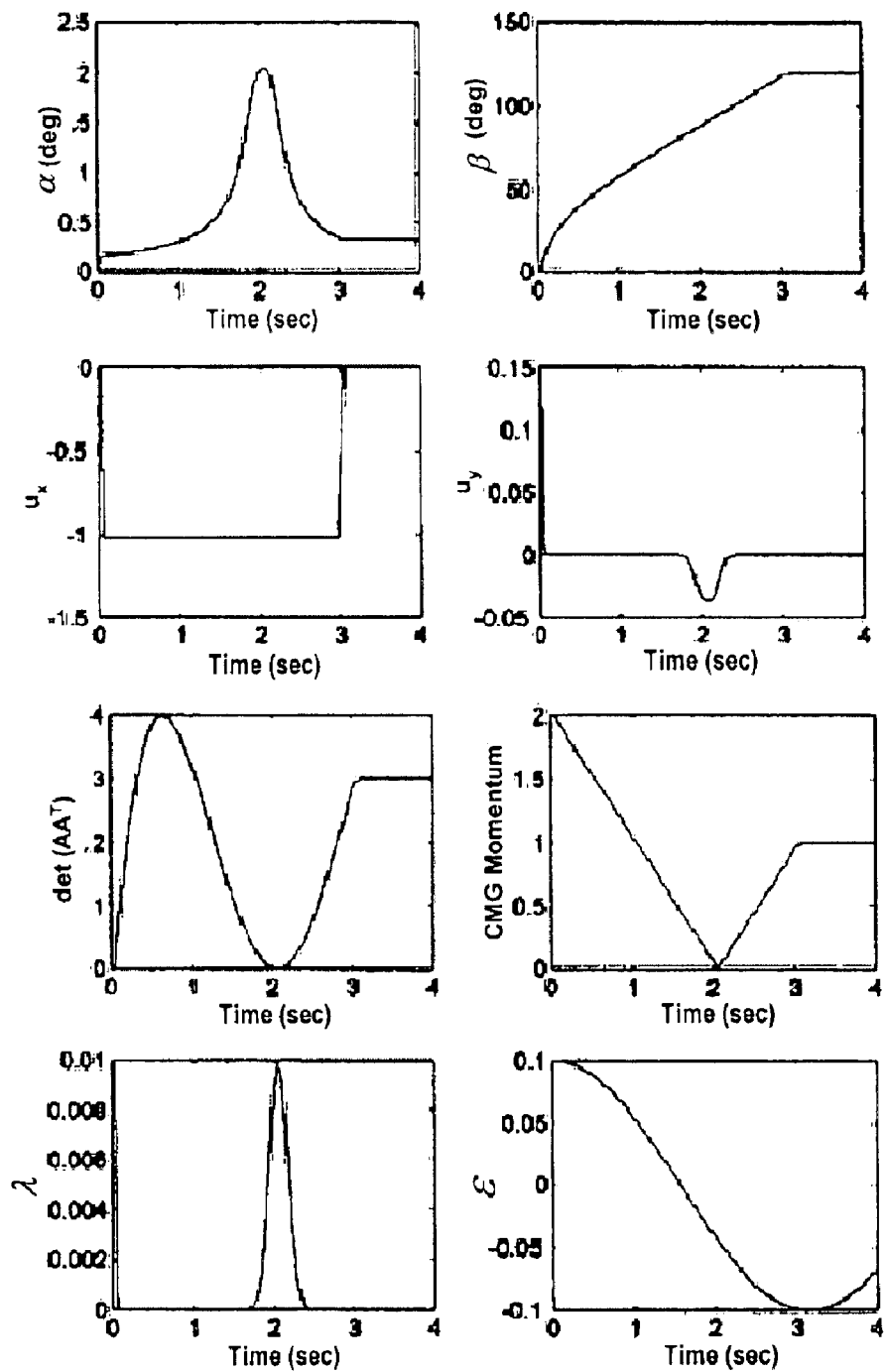
FIG. 5 is a series of plots vs. time of characteristics of a momentum desaturation singularity escape simulation for a two parallel single-gimbal CMG attitude control using the steering logic of the present invention.

As can be seen in FIG. 5, the momentum saturation singularity is escaped using the new steering logic with $$V = \lambda \begin{bmatrix} 1 & \epsilon \\ \epsilon & 1 \end{bmatrix}, W = \begin{bmatrix} 1 & \lambda \\ \lambda & 1 \end{bmatrix} \quad [34]$$

where $\epsilon$=0.1 cos t $\lambda$=0.01 exp(−10 det($AA^T$)).

In FIG. 5, ($u_x$, $u_y$) represent the actual torques generated by the CMG system for the commanded torques of ($\tau_x$, $\tau_y$)=(−1,0) for 0≤t≤3 sec. The CMG momentum is completely desaturated at t=2 sec, but the desaturation torque is commanded until t=3 sec to further explore any problem of encountering an internal singularity. (For all of the simulation results presented in this paper, the commanded torque level as well as the CMG momentum is normalized as one without loss of generality. Thus it should be appropriately adjusted depending on the actual values of gimbal rate limit and CMG momentum magnitude.) As can be seen in FIG. 5, the new steering logic also provides a simple yet effective way of passing through the 0H internal hyperbolic singularity, but with a small transient torque error in $u_y$.

As discussed in Ref. 1, a steering logic based on the direct inverse of A can be obtained for this simple 2×2 problem, as follows:

$$\dot{x}=A^{-1}\tau \quad [35]$$

where $$A-1 = \frac{1}{2|A|} \begin{bmatrix} -\sin\alpha\cos\beta & -\cos\alpha\sin\beta \\ \cos\alpha\cos\beta & -\sin\alpha\sin\beta \end{bmatrix} \quad [36]$$

$$= \frac{1}{2} \begin{bmatrix} -\sin\alpha/\cos\beta & \cos\alpha/\cos\beta \\ -\cos\alpha/\sin\beta & -\sin\alpha/\sin\beta \end{bmatrix}.$$

Then we obtain $$\dot{\alpha} = \frac{-\sin\alpha\tau_x + \cos\alpha\tau_y}{2\cos\beta + \lambda_1} \quad [37]$$

$$\dot{\beta} = \frac{-\cos\alpha\tau_x - \sin\alpha\tau_y}{2(\sin\beta + \lambda_2)} \quad [38]$$

where $\lambda_1$=$\lambda_0$ exp(−$\mu$det($AA^T$))sin $\beta$ [39a]

$\lambda_2$=$\lambda_0$ exp(−$\mu$det($AA^T$))cos $\beta$ [39b]

which are included in the steering law to avoid dividing by zero when the system becomes singular.

Three Parallel Single-Gimbal CMGs

Figure 6:
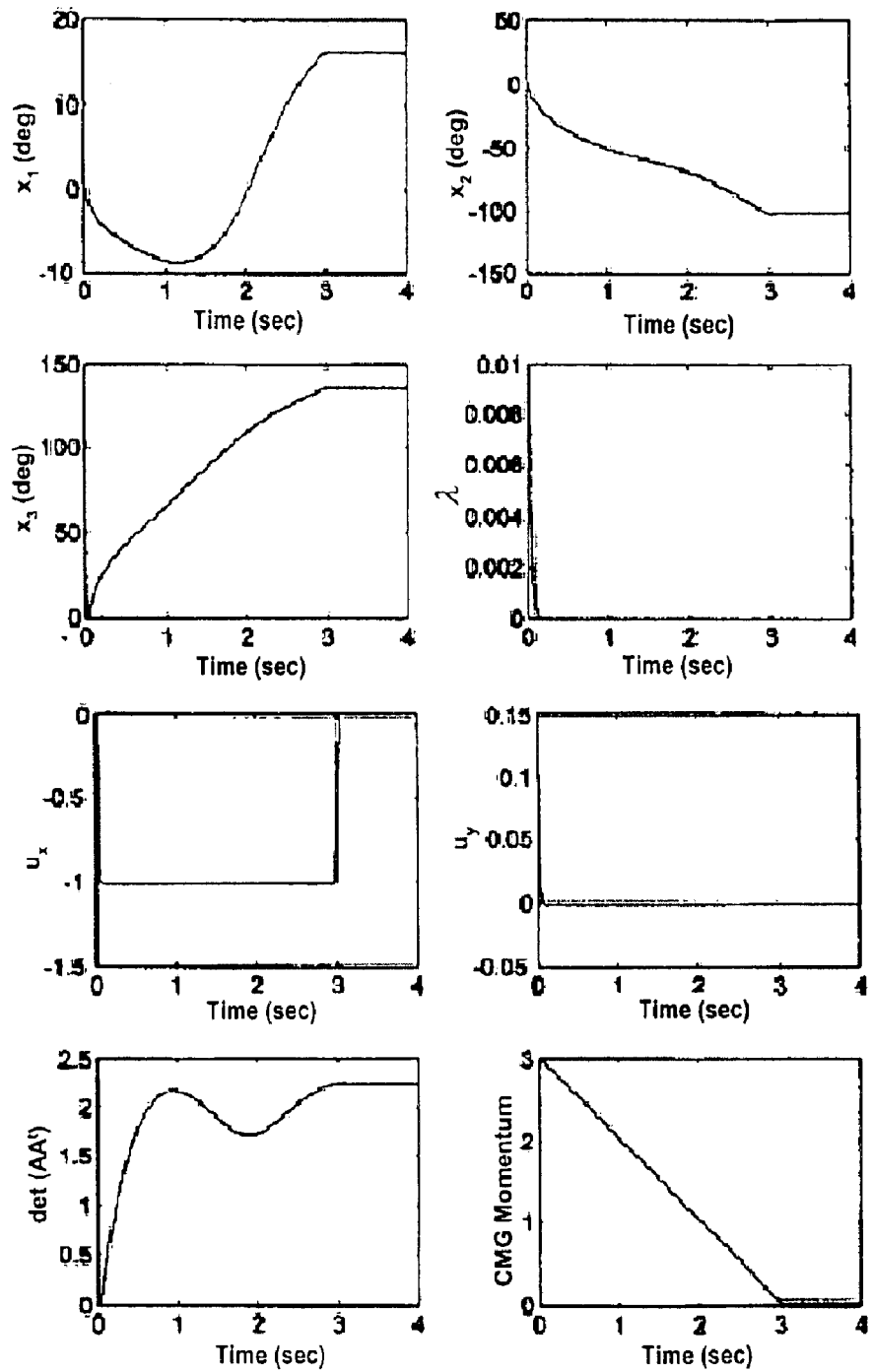
FIG. 6 is a series of plots vs. time of characteristics of a momentum desaturation singularity escape simulation for a three parallel single-gimbal CMG attitude control using the steering logic of the present invention with W=diag{1,2,3}.

For a system of three single-gimbal CMGs with parallel gimbal axes, W should be selected as $W_1$≠$W_2$≠$W_3$ to escape the 3H saturation singularity at ($x_1$, $x_2$, $x_3$)=(0,0,0) with ($\tau_x$, $\tau_y$)=(−1,0). Simulation results of ($\tau_x$, $\tau_y$)=((−1,0) for 0≤t≤3 sec with W=diag{1,2,3} are shown in FIG. 6. Detailed singularity analyses of such a system of three parallel single-gimbal CMGs can be found in Ref. 23.

Pyramid Array of Four Single-Gimbal CMGs

First consider a special case ($\beta$=$\pi$/2) of the pyramid array of four single-gimbal CMGs. Such two orthogonal pairs of two parallel single-gimbal CMGs is of practical importance due to its simple arrangement of four single-gimbal CMGs for three-axis control applications (Refs. 1 and 23).

Figure 7:
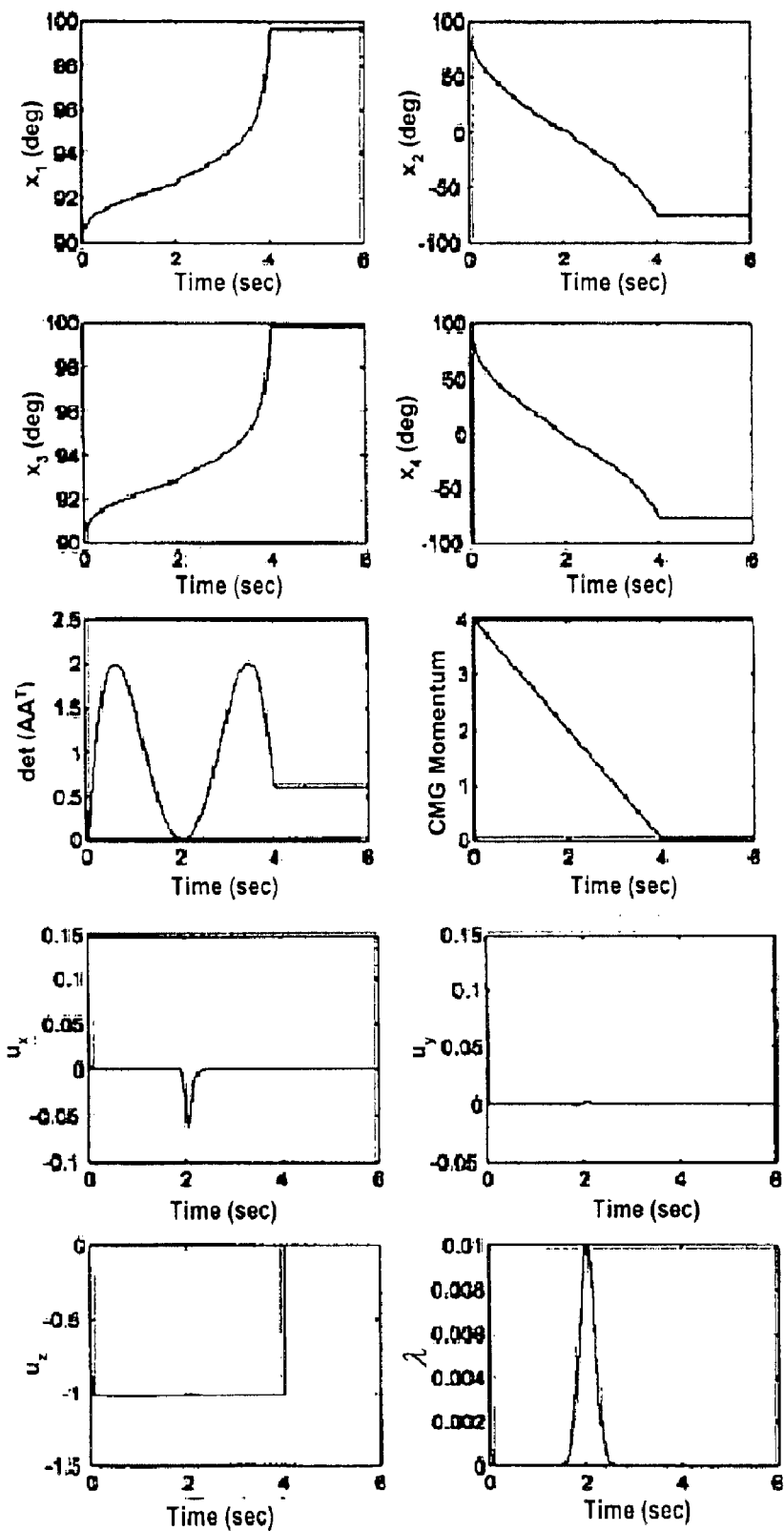
FIG. 7 is a series of plots vs. time of characteristics of a momentum desaturation singularity escape simulation for a four single-gimbal CMG ($\beta=\pi/2$) attitude control using the steering logic of the present invention with W=diag{1,2,3,4}.
Figure 8:
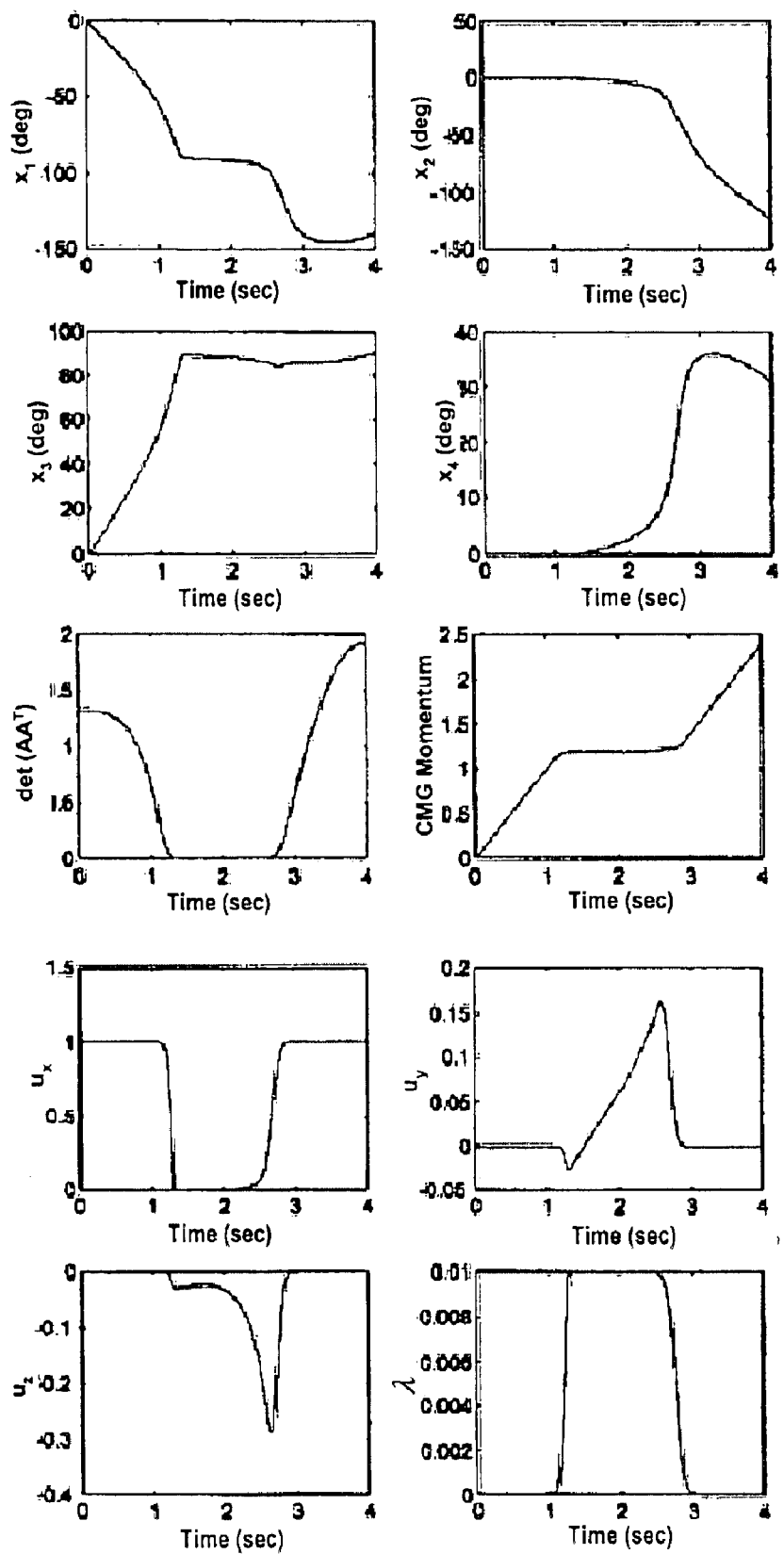
FIG. 8 is a series of plots vs. time of characteristics of a singularity transit simulation for a four single-gimbal CMG ($\beta=53.13$ deg.) attitude control using the steering logic of the present invention with W=diag{1,1,1,1}.

Similar to the case of three parallel single-gimbal CMGs, W≠I is also needed to escape the saturation singularity, as shown in FIG. 8. For this simulation, W=diag{1,2,3,4} was used to escape the saturation singularity at ($\pi$/2,$\pi$/2,$\pi$/2,$\pi$/2) with ($\tau_x$, $\tau_y$, $\tau_z$)=(0,0,−1) for 0≤t≤t≤4 sec. It can be seen in FIG. 7 that an internal singularity is encountered at t=2 sec, but it is rapidly passed through.

In FIG. 8, simulation results are shown for a typical pyramid array of four single-gimbal CMGs ($\gamma$=53.13 deg) with initial gimbal angles of (0,0,0,0) and a torque command of ($\tau_x$, $\tau_y$, $\tau_z$)=(1,0,0). For this simulation, W=diag{1,1,1,1} was used, i.e. the singularity robust steering logic of Refs. 13 and 14 was used for this simulation. It can be seen that the well-known internal elliptic singularity at (−$\pi$/2,0,$\pi$/2,0) is encountered but it is successfully passed through. The inevitable transient torque errors during the singularity transit can be seen in FIG. 8.

Figure 9:
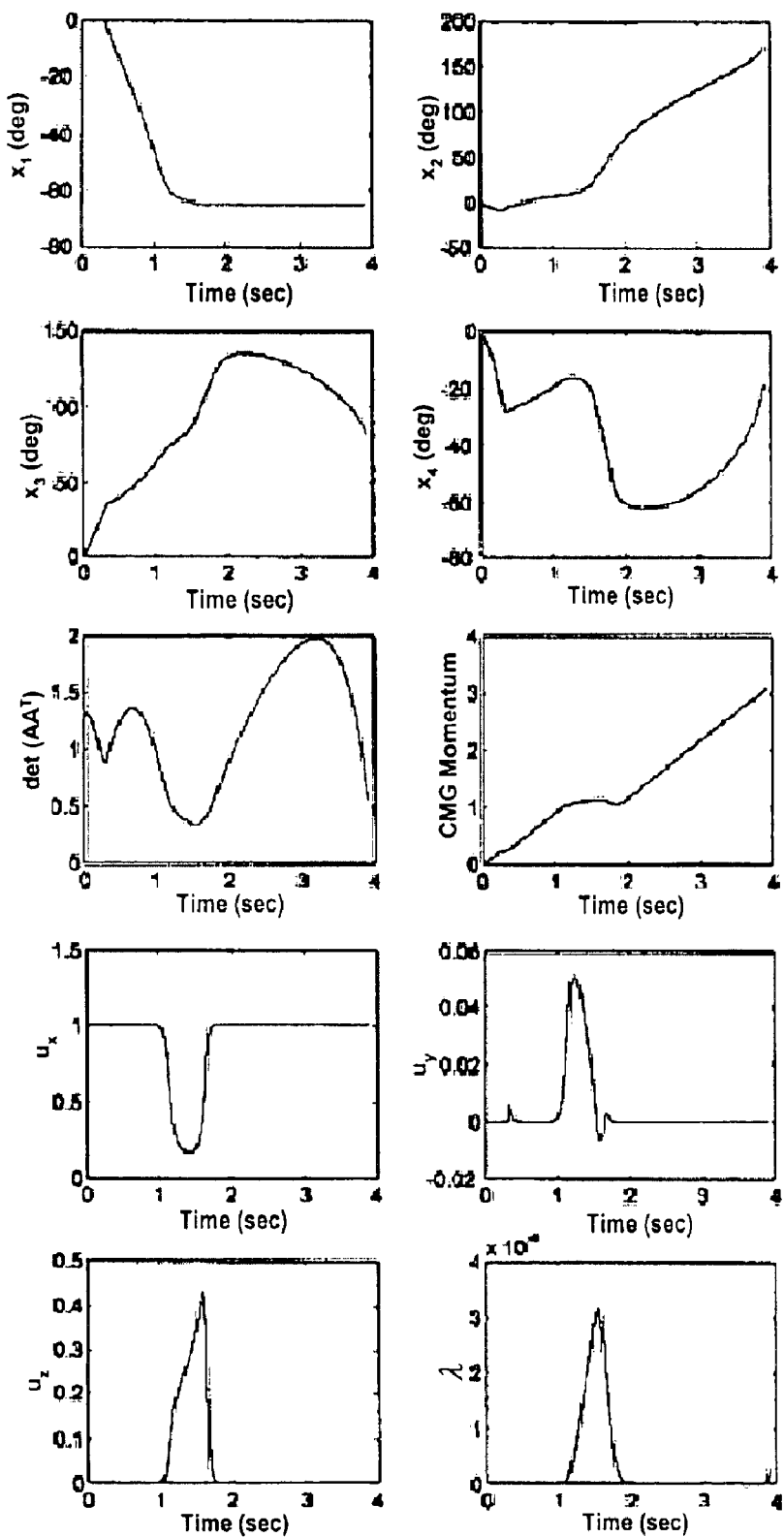
FIG. 9 is a series of plots vs. time of characteristics of a singularity avoidance simulation for a four parallel single-gimbal CMG (β=53.13 deg.) attitude control using the steering logic of the present invention with W=diag{$10^{-4}$, 1,1,1}.

In FIG. 9, simulation results with W=diag{$10^{-4}$,1,1,1} are shown for the previous case of a typical pyramid array of four single-gimbal CMGs ($\beta$=53.13 deg) with initial gimbal angles of (0,0,0,0) and a torque command of ($\tau_x$, $\tau_y$, $\tau_z$)=(1, 0,0). It can be seen that the well known internal elliptic singularity at ($-\pi/2,0,\pi/2,0$) is not encountered. However, the inevitable transient torque errors caused by skirting such a troublesome, impassable elliptic singularity can also be seen in FIG. 9.

Figure 10:
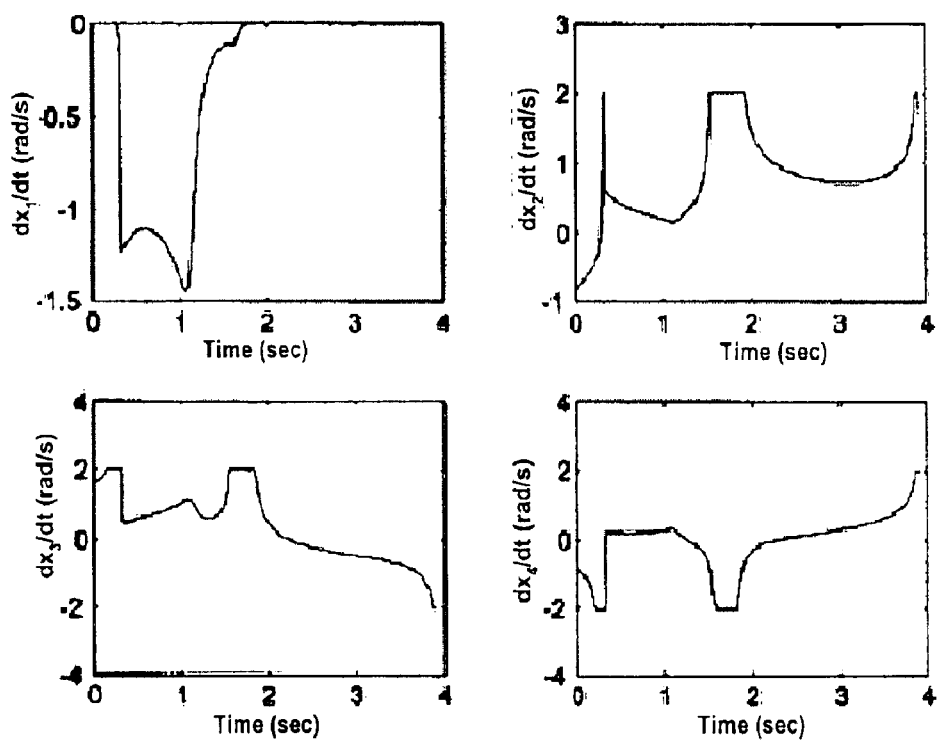
FIG. 10 is a series of plots vs. time of gimbal rate for singularity avoidance simulation with a gimbal rate limit of ±2 rad/sec.

For the simulations shown in FIGS. 8 and 9, the maximum gimbal rate of each CMG was explicitly imposed as $\pm 2$ rad/sec. Such a gimbal rate saturation limit did not affect the singularity-avoidance performance of the proposed steering logic. The gimbal-rate time histories associated with the simulation shown in FIG. 9 are provided in FIG. 10.

Four Parallel Double-Gimbal CMGs

The new steering logic can also be employed for a system of four parallel double-gimbal CMGs described by A$\dot{x}$=$\tau$ where x=($\alpha_1,\alpha_2,\alpha_3,\alpha_4,\beta_1,\beta_2,\beta_3,\beta_4$), $\tau$=($\tau_x$, $\tau_y$, $\tau_z$) and A is a 3×8 Jacobian matrix which can be easily constructed from equation [10].

Figure 11:
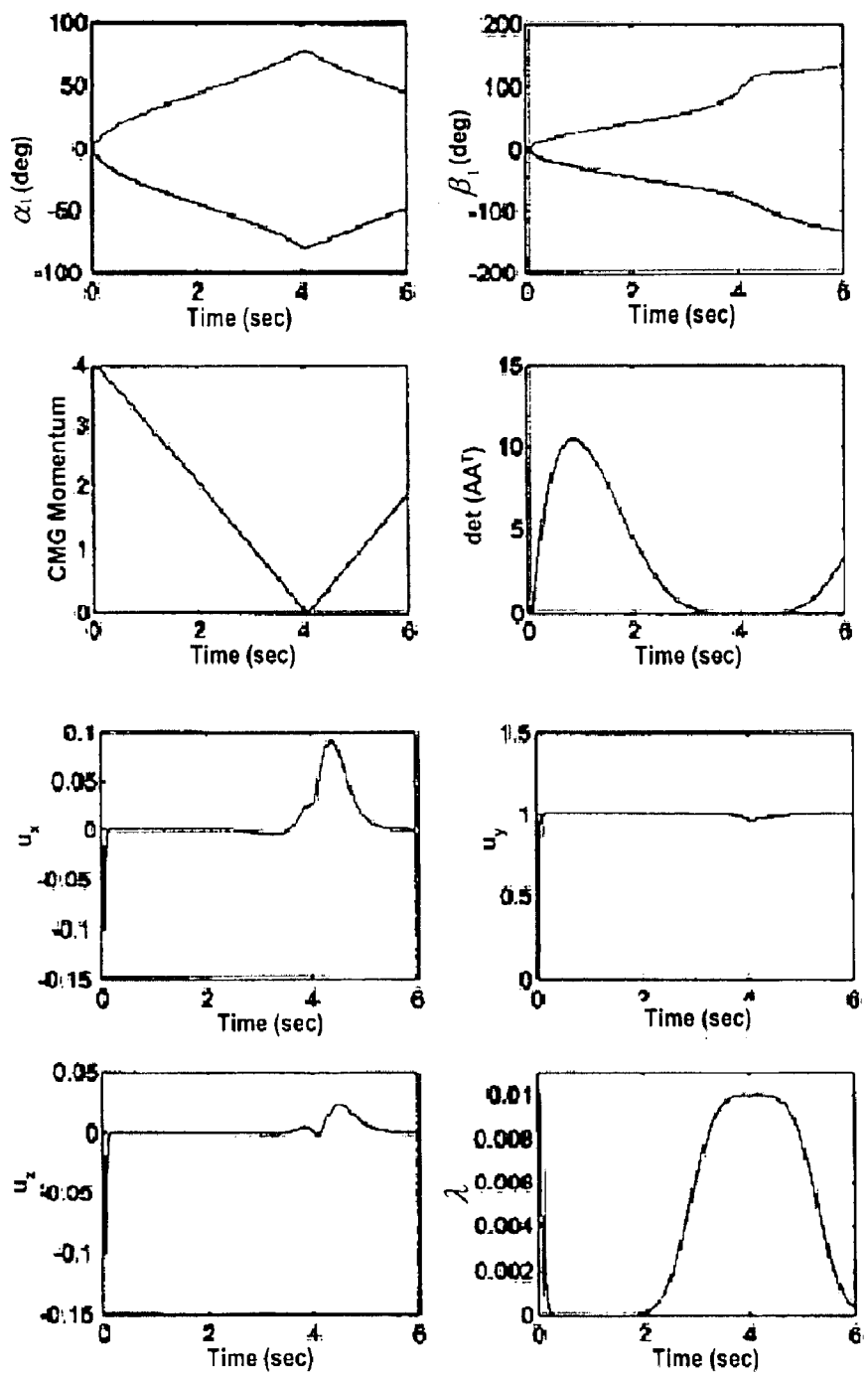
FIG. 11 is a series of plots vs. time of characteristics of a 4H saturation singularity escape passing through the 0H singularity of a four parallel double-gimbal CMG attitude control using the steering logic of the invention with W=diag{1,1,2,2,1,1,2,2}.

The saturation singularity escape capability of the new steering logic is demonstrated in FIG. 11 The simulation conditions for this case are:

Initial gimbal angles: $\alpha_i$=$\beta_i$=0 for all i
Commanded torque: ($\tau_x$, $\tau_y$, $\tau_z$)=(0,1,0)
W diag{1,1,2,2,1,1,2,2,}
$\lambda$=0.01 exp($-$det(AA$^T$))
$\epsilon$=0.1 cost In FIG. 11 we have $\alpha_1$=$\alpha_2$≠$\alpha_3$=$\alpha_4$ and $\beta_1$=$\beta_2$≠$\beta_3$=$\beta_4$. For this case with W=diag{1,1,2,2,1,1,2,2} it escapes the saturation singularity but it passes through the 0H singularity, as can be seen in FIG. 11. However, for W=I, this system remains singular at its singular momentum envelope, i.e. the patented steering logic of Refs. 13 and 14 is unable to escape the saturation singularity of this system of four double-gimbal CMGs even when CMG momentum desaturation is requested.

Figure 12:
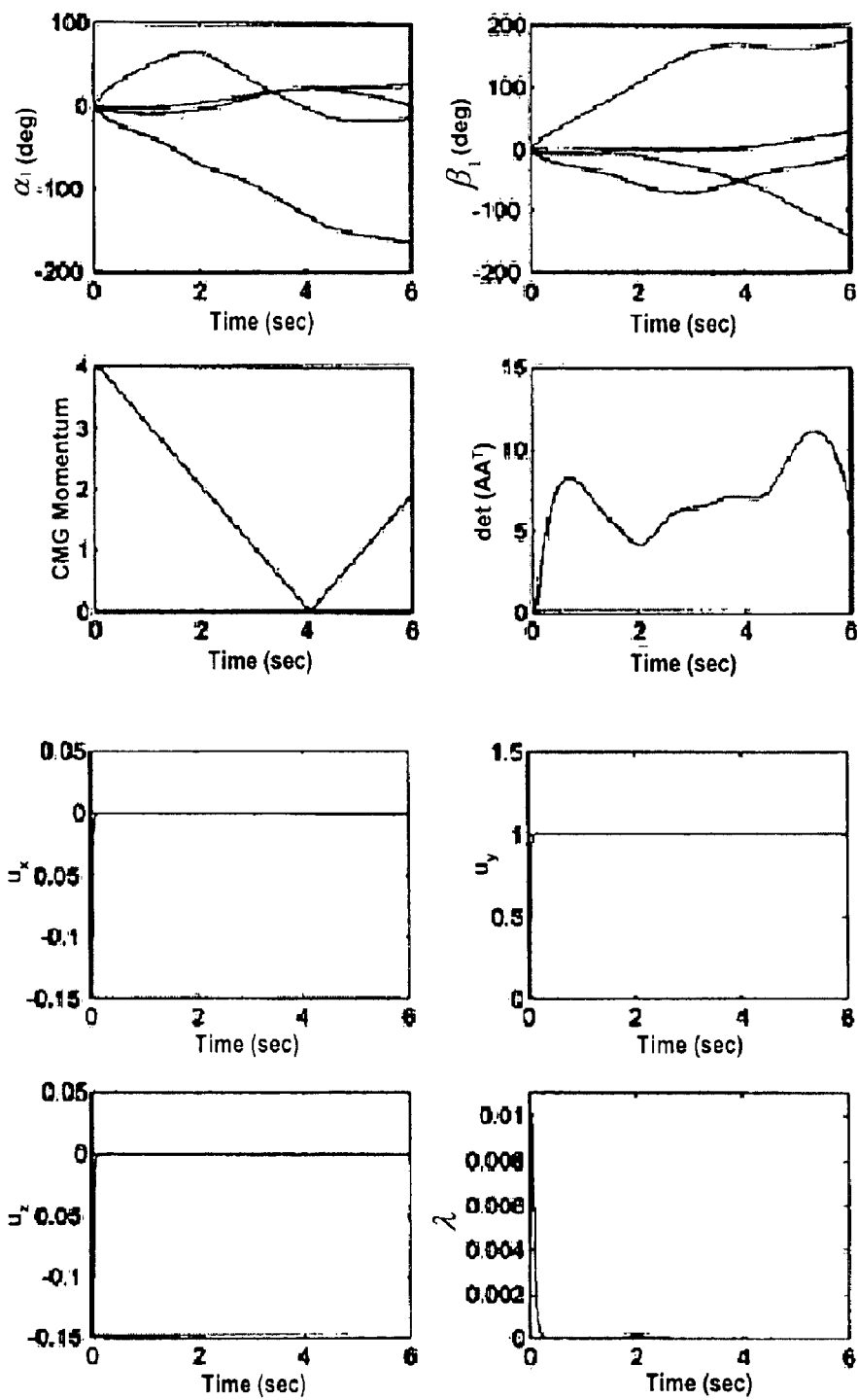
FIG. 12 is a series of plots vs. time of characteristics of a momentum desaturation singularity escape simulation for a four parallel double-gimbal CMG attitude control escaping the saturation singularity and also avoiding 0H singularity using the steering logic of the present invention with W=diag{1,2,3,4,1,2,3,4}.
Figure 13:
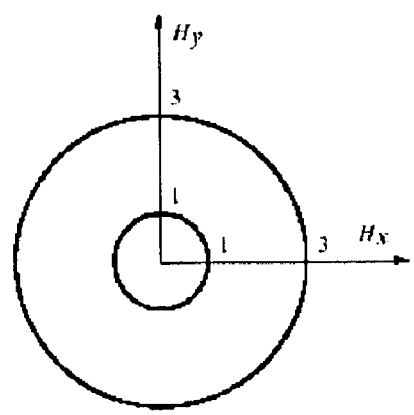
FIG. 13 is a diagrammatic illustration of a three single-gimbal CMG array with parallel axes and FIGS. 13(a) and (b) represent 1H anti-parallel and 3H parallel singularities, respectively.
Figure 13A:
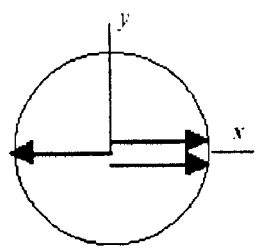
Figure 13B:
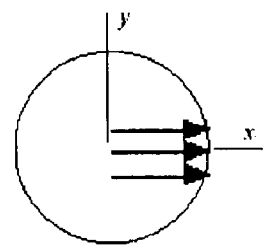

Furthermore, when we choose W=diag{1,2,3,4,1,2,3,4}, it can be seen in FIG. 12 that it escapes the saturation singularity and that the 0H singularity is completely avoided with no transient torque errors. The CMG momentum is completely desaturated at t=4 sec to further explore any problem of encountering an internal singularity:

This example of a system of four double-gimbal CMGs demonstrates that it is feasible to completely avoid singularity encounters (with no transient torque errors) with a proper selection of W in conjunction with the deterministic dither signals generated in V.

For the parallel mounting arrangement of four double-gimbal CMGs, the x-axis torque component is not a function of the outer gimbal $\beta_i$ motions as can be seen in equation [10]. Consequently the inner gimbal rate commands can be determined first for the commanded torque $\tau_x$, then the outer gimbal rate commands for ($\tau_y$, $\tau_z$). In particular Kennel's CMG steering law distributes the CMG angular momentum vectors such that all inner gimbal angles are equal, which reduces the rate requirements on the outer gimbals as follows:

$$\dot{\alpha}_i = \frac{\tau_x}{\Sigma \cos\alpha_i} + k(\alpha^* - \alpha_i) \quad [40]$$

where k is called the inner gimbal angle distribution gain and $\alpha^\#$ is the desired inner gimbal angle for all CMGs chosen as $$\alpha^* = \frac{\Sigma(\cos\alpha_i)\alpha_i}{\Sigma\cos\alpha_i}. \quad [41]$$

The new steering logic can then be incorporated with Kennel's steering law to generate the outer gimbal rate commands $\dot{\beta}_i$ using a reduced 2×4 Jacobian matrix without requiring Kennel's virtual CMG for avoiding 2H-singularity encounters.

Figure 4A:
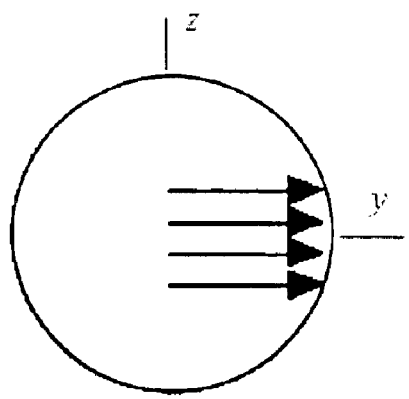
FIGS. 4(a)–(d) are diagrammatic representations of a four parallel-gimbal CMG attitude control in three singularity causing relationships (a)–(c) and in one relationship (d) not a singularity.
Figure 4B:
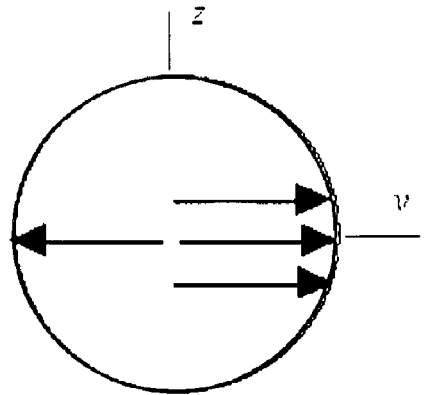
Figure 4C:
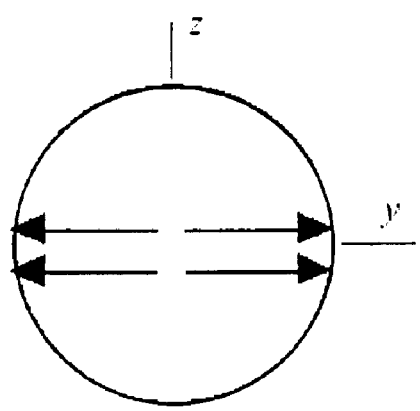
Figure 4D:
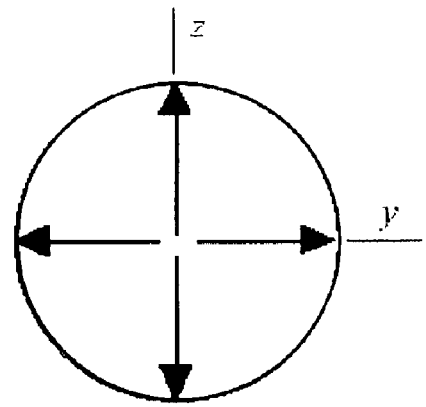

Simulation results also show that the new steering logic rapidly transits through the 2H singularity shown in FIG. 4(b).

Figure 14:
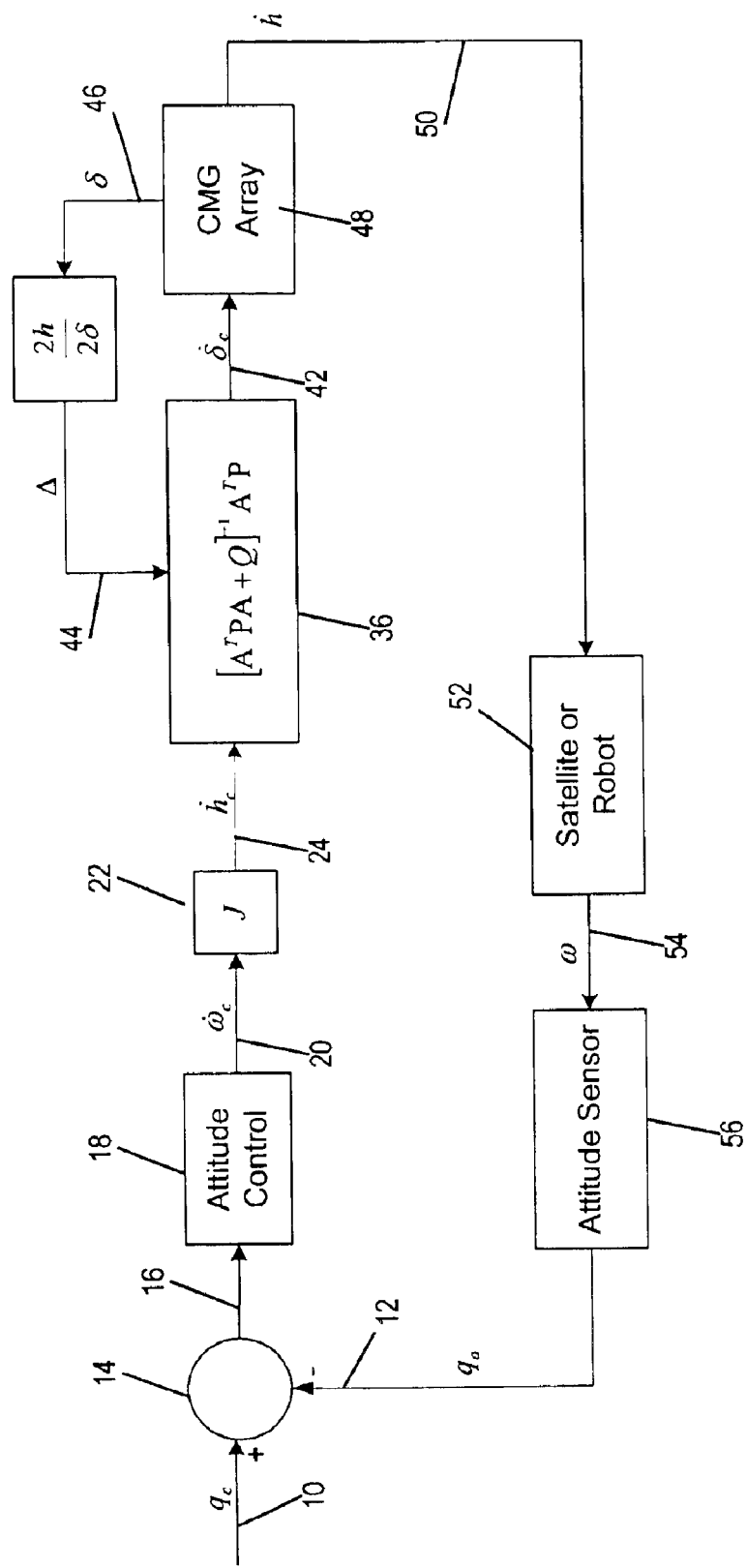
FIG. 14 is a functional block diagram showing a control embodying the present invention to rotate a satellite in response to commanded rotation signal $q_c$.

In FIG. 14, an exemplary embodiment, like that of the incorporated-by-reference patent of Ref. 14, applied to satellite attitude control, the desired satellite attitude q$_c$ at input 10 is presented as Euler angles, quaternions, Gibbs parameters, or some other convenient way of describing the attitude of a satellite. At 14 it is compared with actual attitude q$_a$ at input 12 generated by the Inertial Measurement Unit (IMU) 56 or some other method for determining satellite attitude. The attitude error 16 is used by the attitude control 18 to generate a desired body acceleration $\dot{\omega}_c$ at output 20. The torque command, $\dot{h}_c$ at output 24 is calculated at 22 from the spacecraft inertial matrix, J$_s$, $\dot{h}_c$=J$_s\dot{\omega}_c$. The modified pseudo inverse 36 is used to calculate the close loop gimbal rates $\delta_c$ at 42, according to the following:

$$\dot{\delta}_c = A^T[PAA^T+Q]^{-1}A^TP, \quad [42]$$

Q and P being as defined above.

The time varying off diagonal terms in P provide the escape of a control trajectory even when it is started a Moore-Penrose elliptical singularity. The CMG array 48 responds to the gimbal rate command 42. The new gimbal angles $\delta$ at 46 are used to generate at 44 the Jacobean $$A = \frac{2h}{2\delta} \quad [43]$$

used in the pseudo inverse. The CMG array 48 movement produces torque $\dot{h}$ 50 on the satellite 52. The satellite motion $\omega$ 54 is detected by the attitude sensors 56.

It will be appreciated that FIG. 14 shows function blocks that may be implemented through hardware or software, preferably the latter in a computer based satellite control containing one or more signal processors programmed to produce output signals to control CMGs on the satellite as explained. Fundamentally the process is shown for a single signal path between two points, but it should be understood that single lines represent vector data which is 3 dimensional for the satellite attitude, attitude rate and torque, and a dimensional for the signals related to the n CMGs.

As used herein the terms "controller," "control" and "control system" shall mean the calculating, signal producing and processing, and force, thrust or torque producing arrangements that control spacecraft, robot or other object attitude in cooperation with a CMG array. Such controllers are known in the art and may include a dedicated control system computer or other data processing facility that calculates the control signals produced, the mechanical force, thrust or torque to be imparted using the steering logic programmed therein.

Although preferred embodiments of the invention have been described in detail, it will be readily appreciated by those skilled in the art that further modifications, alterations and additions to the invention embodiments disclosed may be made without departure from the spirit and scope of the invention as set forth in the appended claims.

References (1) Crenshaw, J., "2-SPEED, A Single-Gimbal Control Moment Gyro Attitude Control System" Paper No. 73–895, presented at *AIAA Guidance and Control Conference*, Key Biscayne, Fla., Aug. 20–22, 1973.

(2) Margulies, G. and Aubrun, J. N., "Geometric Theory of Single-Gimbal Control Moment Gyro Systems," *Journal of the Astronautical Sciences*, Vol. 26, No. 2, 1978, pp. 159–191.

(3) Cornick, D. E., "Singularity Avoidance Control Laws for Single Gimbal Control Moment Gyros," Paper No. 79–1698, *Proceedings of the AIAA Guidance and Control Conference*, Boulder, Colo., August 1979, pp. 20–33.

(4) Kennel, H. F., "Steering Law for Parallel Mounted Double-Gimballed Control Moment Gyros: Revision A," NASA TM-82390, January 1981.

(5) Bedrossian, N. S., Paradiso, J., Bergmann, E. V., and Rowell, D., "Redundant Single-Gimbal Control Moment Gyroscope Singularity Analysis," *Journal of Guidance, Control and Dynamics*, Vol. 13, No. 6, 1990, pp. 1096–1101.

(6) Bedrossian, N. S., Paradiso, J., Bergmann, E. V., and Rowell, D., "Steering Law Design for Redundant Single-Gimbal Control Moment Gyroscopes," *Journal of Guidance, Control, and Dynamics*, Vol. 13, No. 6, 1990, pp. 1083–1089 (also, N. S. Bedrossian's M. S. thesis at MIT, August 1987).

(7) Vadali, S. R., Oh, H., and Walker, S., "Preferred Gimbal Angles for Single Gimbal Control Moment Gyroscopes," *Journal of Guidance, Control, and Dynamics*, Vol. 13, No. 6, 1990, pp. 1090–1095.

(8) Paradiso, J. A., "Global Steering of Single Gimballed Control Moment Gyroscopes Using a Direct Search," *Journal of Guidance, Control, and Dynamics*, Vol. 15, No. 5, 1992, pp. 1236–1244.

(9) Schaub, H. and Junkins, J. L., "Singularity Avoidance Using Null Motion and Variable-Speed Control Moment Gyros," *Journal of Guidance, Control, and Dynamics*, Vol. 23, No. 1, 2000, pp. 11–16.

(10) Ford, K. A. and Hall, C. D., "Singular Direction Avoidance Steering for Control Moment Gyros," *Journal of Guidance, Control, and Dynamics*, Vol. 23, No. 4, 2000, pp. 648–656.

(11) Heiberg, C. J., Bailey, D., and Wie, B., "Precision Spacecraft Pointing Using Single-Gimbal Control Moment Gyros with Disturbance," *Journal of Guidance, Control, and Dynamics*, Vol. 23, No. 1, 2000, pp. 77–85.

(12) Wie, B., *Space Vehicle Dynamics and Control*, AIAA Education Series, AIAA, Washington, D.C., 1998, Chapter 7.

(13) Wie, B., Heiberg, C., and Bailey, D., "Singularity Robust Steering Logic for Redundant Single-Gimbal Control Moment Gyros," *Journal of Guidance, Control, and Dynamics*, Vol. 24, No. 5, 2001, pp. 865–872.

(14) Wie, B., Bailey, D., and Heiberg, C., "Robust Singularity Avoidance in Satellite Attitude Control," U.S. Pat. No. 6,039,290, Issued Mar. 21, 2000.

(15) Bailey, D., Heiberg, C. and Wie, B., "Continuous Attitude Control That Avoids CMG Array Singularities," U.S. Pat. No. 6,131,056, Issued Oct. 10, 2000.

(16) Wie, B., Heiberg, C., and Bailey, D., "Rapid Multi-Target Acquisition and Pointing Control of Agile Spacecraft," *Journal of Guidance, Control, and Dynamics*, Vol. 25, No. 1, 2002, pp. 96–104.

(17) Dominguez, J. and Wie, B., "Computation and Visualization of Control Moment Gyroscope Singularities," Paper No. 2002–4570, *AIAA Guidance, Navigation, and Control Conference*, Monterey, Calif., Aug. 5–8, 2002.

(18) Roser, X., Sghedoni, M., "Control Moment Gyroscopes (CMGs) and their Application in Future Scientific Missions," *Proceedings of $3^{rd}$ ESA International Conference on Spacecraft Guidance, Navigation, and Control Systems*, ESTEC, Noordwijk, The Netherlands, Nov. 26–29, 1996, pp. 523–528.

(19) Busseuil, J., Llibre, M., and Roser, X., "High Precision Mini-CMG's and their Spacecraft Applications," presented at *AAS Guidance and Control-Advances in the Astronautical Sciences*, Breckenridge, Colo., February 1998.

(20) Salenc, C. and Roger, X., "AOCS for Agile Scientific Spacecraft with mini-CMGs," *Proceedings of $4^{th}$ ESA International Conference on Spacecraft Guidance, Navigation, and Control Systems*, ESTEC, Noordwijk, The Netherlands, Oct. 18–21, 1999, pp. 379–384.

(21) Defendini, A, Lagadec, K., Guay, P., and Griseri, G., "Low Cost CMG-based AOCS Designs," *Proceedings of $4^{th}$ ESA International Conference on Spacecraft Guidance, Navigation, and Control Systems*, ESTEC, Noordwijk, The Netherlands, Oct. 18–21, 1999, pp. 393–398.

(22) Lappas, V. J., Steyn, W. J., and Underwood, C. I., "Attitude Control for Small Satellites Using Control Moment Gyros," presented at $52^{nd}$ *International Astronautical Federation Congress*, Toulouse, France, Oct. 1–5, 2001.

(23) Wie, B., "Singularity Analysis and Visualization of Single-Gimbal Control Moment Gyro Systems," AIAA Paper No. 2003-5658, *AIAA Guidance, Navigation, and Control Conference*, Austin, Tex., Aug. 11–14, 2003.

(24) Nakamura, Y. and Hanafusa, H., "Inverse Kinematic Solutions with Singularity Robustness for Robot Manipulator Control," *Journal of Dynamic Systems, Measurement, and Control*, Vol. 108, Sept. 1986, pp. 163–171.

Each of the foregoing references (1–24) is incorporated herein by reference.

I claim:

1. In a control moment gyro (CMG) attitude control of the kind comprising an angular rate signal generator for each gyro in a CMG array using pseudoinverse control law that uses a torque command signal and a Jacobian value for the angle of the gyro; the improvement comprising a controller having:

(a) programming to calculate the Jacobian $A^{\#}$ from weighting matrices W and V, (b) programming enabling selection of terms of the matrix W, and (c) programming to compute a gimbal rate command $\dot{x}$ from a control torque command $\tau$ and the Jacobian developed from the matrices W and V.

2. The attitude control according to claim 1, wherein V is substantially of the form:

$$V = \lambda \begin{bmatrix} 1 & \varepsilon_3 & \varepsilon_2 \\ \varepsilon_3 & 1 & \varepsilon_1 \\ \varepsilon_2 & \varepsilon_1 & 1 \end{bmatrix} > 0,$$

wherein $\lambda = \lambda_0 \sin(\omega t + \phi_i)$, and $\lambda_0, \mu, \varepsilon_0, \omega$ and $\phi_i$ are selected constant parameters.

3. The attitude control according to claim 1, wherein V is substantially of the form:

$$V = \lambda \begin{bmatrix} 1 & \varepsilon_3 & \varepsilon_2 \\ \varepsilon_3 & 1 & \varepsilon_1 \\ \varepsilon_2 & \varepsilon 1 & 1 \end{bmatrix} > 0$$

and wherein $\lambda = \lambda_0 \exp(-\mu \det(AA^T))$, and $\varepsilon_i = \varepsilon_0 \sin(\omega t + \phi_i)$, where $\lambda_0$, $\mu$, $\varepsilon_0$, $\omega$, and $\phi_i$, are selected parameters.

4. The attitude control according to any one of claims 1, 2 and 3, wherein W is substantially of the form:

$$W = \begin{bmatrix} \omega_1 & \lambda & \lambda & \lambda \\ \lambda & \omega_2 & \lambda & \lambda \\ \lambda & \lambda & \omega_3 & \lambda \\ \lambda & \lambda & \lambda & \omega_4 \end{bmatrix} > 0,$$

and different values of $\omega_i$ and/or nonzero off-diagonal elements are chosen to escape all types of singularities, including external saturation singularities.

5. The attitude control according to claim 1, wherein $W \neq I$, I being an identity matrix.

6. The attitude control according to claim 1, wherein the CMG array comprises two parallel single-gimbal CMGs and wherein substantially:

$$V = \lambda \begin{bmatrix} 1 & \varepsilon \\ \varepsilon & 1 \end{bmatrix}, \text{ and}$$

$$W = \begin{bmatrix} 1 & \lambda \\ \lambda & 1 \end{bmatrix}, \text{ where}$$

$\epsilon = 0.1 \cos t$, and $\lambda = 0.01 \exp(-10 \det(AA^T))$.

7. The attitude control according to claim 1, wherein the CMG array comprises three single-gimbal GMBs with parallel axes and W is selected as $W_1 \neq W_2 \neq W_3$.

8. The attitude control according to claim 1, wherein the CMG array comprises four single gimbal CMGs in a pyramid array and:

$W \neq I$, an identity matrice.

9. The attitude control according to claim 8, wherein, substantially:

$W = \text{diag}\{1,2,3,4\}$.

10. The attitude control according to claim 8, wherein, substantially:

$W = \text{diag}\{1,1,1,1\}$.

11. The attitude control according to claim 8, wherein, substantially:

$W = \text{diag}\{10^{-4},1,1,1\}$.

12. The attitude control according to claim 1, wherein the CMG array comprises four double-gimbal CMGs and wherein substantially:

$x = (\alpha_1, \alpha_2, \alpha_3, \alpha_4, \beta_1, \beta_2, \beta_3, \beta_4)$, $\tau = (\tau_x, \tau_y, \tau_z)$, and substantially $W = \text{diag}\{1,1,2,2,1,1,2,2\}$.

13. The attitude control according to claim 1, wherein the CMG array comprises four double-gimbal CMGs and wherein substantially:

$x = (\alpha_1, \alpha_2, \alpha_3, \alpha_4, \beta_1, \beta_2, \beta_3, \beta_4)$ $\tau = (\tau_x, \tau_y, \tau_z)$, and substantially $W = \text{diag}\{1,2,3,4,1,2,3,4\}$.

14. In an attitude control system of the kind that includes an array of a plurality of CMGs, means for generating an angular rate signal for each of the CMGs using pseudoinverse control law that uses a torque command signal and a Jacobian value for the angle of each gyro, the improvement comprising:

(a) a singularity escaping and avoiding attitude controller developing commands based upon a control logic and having;

(i) means for calculating $\dot{x} = A^\# \tau$, where $\dot{x} = (x_1, \ldots x_n)$, the Jacobian $A^\# = [A^T PA + Q]^{-1} A^T P$ $= WA^T[AWA^T + V]^{-1}$ where $W \equiv Q^{-1}$ and $V \equiv P^{-1}$, $$P^{-i} \equiv V = \lambda \begin{bmatrix} 1 & \varepsilon_e & \varepsilon_2 \\ \varepsilon_3 & 1 & \varepsilon_1 \\ \varepsilon_2 & \varepsilon_1 & 1 \end{bmatrix} > 0,$$

$\lambda = \lambda_0 \exp(-\mu \det(AA^T))$, $\varepsilon_i = \varepsilon_0 \sin(\omega t + \phi_i)$, and $$Q^{-1} \equiv W = \begin{bmatrix} \omega_1 & \lambda & \lambda & \lambda \\ \lambda & \omega_2 & \lambda & \lambda \\ \lambda & \lambda & \omega_3 & \lambda \\ \lambda & \lambda & \lambda & \omega_4 \end{bmatrix} > 0.$$

15. In a method of control moment gyro (CMG) attitude control using steering logic to develop steering inputs to the array and in which the steering logic is substantially of the form $\dot{x} = A\tau$, where $\dot{x}$ is the gimbal rate command, A is the Jacobian of CMG array angular momentum with respect to gimbal angle, $\tau$ is the control torque command; the improvement comprising computing $\dot{x} = A^\# \tau$, where $A^\# = [A^T PA + Q]^{-1} A^T P$ $= WA^T[AWA^T + V]^{-1}$ where $W \equiv Q^{-1}$ and $V \equiv P^{-1}$, and W and V are weighting matrices chosen to avoid singularities.

16. The method of CMG attitude control according to claim 15, wherein V is substantially of the form $$V = \lambda \begin{bmatrix} 1 & \varepsilon_3 & \varepsilon_2 \\ \varepsilon_3 & 1 & \varepsilon_1 \\ \varepsilon_2 & \varepsilon_1 & 1 \end{bmatrix} > 0,$$

wherein $\lambda = \lambda_0 \sin(\omega t + \phi_i)$, and $\lambda_0, \mu, \epsilon_0, \omega$ and $\phi_i$ are selected constant parameters.

17. The method of CMG attitude control according to claim 15, wherein V is substantially of the form:

$$V = \lambda \begin{bmatrix} 1 & \varepsilon_3 & \varepsilon_2 \\ \varepsilon_3 & 1 & \varepsilon_1 \\ \varepsilon_2 & \varepsilon_1 & 1 \end{bmatrix} > 0$$

wherein $\lambda = \lambda_0 \exp(-\mu \det(AA^T))$, and $\epsilon_i = \epsilon_0 \sin(\omega t + \phi_i)$.

18. The method of CMG attitude control according to any one of claims 15, 16 and 17, wherein W is substantially of the form:

$$W = \begin{bmatrix} \omega_1 & \lambda & \lambda & \lambda \\ \lambda & \omega_2 & \lambda & \lambda \\ \lambda & \lambda & \omega_3 & \lambda \\ \lambda & \lambda & \lambda & \omega_4 \end{bmatrix} > 0$$

and values of $\omega$ and/or nonzero off-diagonal elements are chosen to escape singularities.

19. The method of CMG attitude control according to claim 15, wherein W≠I, I being an identify matrix.

20. The method of CMG attitude control according to claim 15, wherein the CMG array comprises two parallel single-gimbal CMGs and wherein substantially:

$$V = \lambda \begin{bmatrix} 1 & \varepsilon \\ \varepsilon & 1 \end{bmatrix}, \text{ and}$$

$$W = \begin{bmatrix} 1 & \lambda \\ \lambda & 1 \end{bmatrix}, \text{ where}$$

$\epsilon = 0.1 \cos t$, and $\lambda = 0.01 \exp(-10 \det(AA^T))$.

21. The method of CMG attitude control according to claim 15, wherein the CMG array comprises three single-gimbal GMBs with parallel axes and W is selected as $W_1 \neq W_2 \neq W_3$.

22. The method of CMG attitude control according to claim 15, wherein the CMG array comprises four single gimbal CMGs in a pyramid array and:

W≠I, an identity matrice.

23. The method of CMG attitude control according to claim 22, wherein, substantially:

W=diag{1,2,3,4}.

24. The method of CMG attitude control according to claim 22, wherein, substantially:

W=diag{1,1,1,1}.

25. The method of CMG attitude control according to claim 22, wherein, substantially:

$W = diag\{10^{-4}, 1, 1, 1\}$.

26. The method of CMG attitude control according to claim 15, wherein the CMG array comprises four double-gimbal CMGs and wherein substantially:

$x = (\alpha_1, \alpha_2, \alpha_3, \alpha_4, \beta_1, \beta_2, \beta_3, \beta_4)$, $\tau = (\tau_x, \tau_y, \tau_z)$, and substantially W=diag{1,1,2,2,1,1,2,2}.

27. The method of CMG attitude control according to claim 15, wherein the CMG array comprises four double-gimbal CMGs and wherein substantially:
$x = (\alpha_1, \alpha_2, \alpha_3, \alpha_4, \beta_1, \beta_2, \beta_3, \beta_4)$, $\tau = (\tau_x, \tau_y, \tau_z)$, and substantially W=diag{1,2,3,4,1,2,3,4}.

28. In a method of attitude control system of the kind that includes providing an array of a plurality of CMGs, means for generating an angular rate signal for each of the CMGs using pseudoinverse control law that uses a torque command signal and a Jacobian value for the angle of each gyro, the improvement comprising:
  (a) developing singularity escaping and avoiding attitude commands based upon a control logic including;
     (i) calculating $\dot{x} = A^\# \tau$,
where $\dot{x} = (x_1, \ldots x_n)$, the Jacobian $A^\# = [A^T P A + Q]^{-1} A^T P$ $= WA^T [AWA^T + V]^{-1}$ where $W \equiv Q^{-1}$ and $V \equiv P^{-1}$, $$P^{-1} \equiv V = \lambda \begin{bmatrix} 1 & \varepsilon_e & \varepsilon_2 \\ \varepsilon_3 & 1 & \varepsilon_1 \\ \varepsilon_2 & \varepsilon_1 & 1 \end{bmatrix} > 0,$$

$\lambda = \lambda_0 \exp(-\mu \det(AA^T))$, $\epsilon_i = \epsilon_0 \sin(\omega t + \phi_i)$, and $$Q^{-1} \equiv W = \begin{bmatrix} \omega_1 & \lambda & \lambda & \lambda \\ \lambda & \omega_2 & \lambda & \lambda \\ \lambda & \lambda & \omega_3 & \lambda \\ \lambda & \lambda & \lambda & \omega_4 \end{bmatrix} > 0.$$

* * * * *